United States Patent
Jacobsen et al.

(10) Patent No.: US 9,217,868 B2
(45) Date of Patent: Dec. 22, 2015

(54) MONOCULAR DISPLAY DEVICE

(75) Inventors: Jeffrey J. Jacobsen, Hollister, CA (US); Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 654 days.

(21) Appl. No.: 12/008,104

(22) Filed: Jan. 8, 2008

(65) Prior Publication Data
US 2008/0169998 A1   Jul. 17, 2008

Related U.S. Application Data

(60) Provisional application No. 60/880,270, filed on Jan. 12, 2007, provisional application No. 60/930,242, filed on May 15, 2007, provisional application No. 60/962,686, filed on Jul. 31, 2007, provisional application No. 60/999,801, filed on Oct. 19, 2007.

(51) Int. Cl.
*G09G 5/00* (2006.01)
*G02B 27/01* (2006.01)

(52) U.S. Cl.
CPC .... *G02B 27/0172* (2013.01); *G02B 2027/0123* (2013.01); *G02B 2027/0138* (2013.01); *G02B 2027/0154* (2013.01); *G02B 2027/0156* (2013.01); *G02B 2027/0161* (2013.01); *G02B 2027/0178* (2013.01)

(58) Field of Classification Search
CPC ... G02B 27/027; G09G 2370/16; G09G 5/005
USPC .......................................................... 345/7–9
See application file for complete search history.

(56) References Cited

U.S. PATENT DOCUMENTS

| | | | |
|---|---|---|---|
| 3,953,114 A | | 4/1976 | Bidgood |
| 4,201,316 A | | 5/1980 | Klingaman |
| 5,235,979 A | * | 8/1993 | Adams .............................. 607/5 |
| 5,515,070 A | | 5/1996 | Kawada |
| 5,806,526 A | * | 9/1998 | Rhoad ........................... 128/864 |
| 5,812,977 A | | 9/1998 | Douglas |

(Continued)

FOREIGN PATENT DOCUMENTS

| | | |
|---|---|---|
| CN | 1435707 | 8/2003 |
| CN | 1685273 | 10/2005 |

(Continued)

OTHER PUBLICATIONS

Wang, X., "Video Streaming over Bluetooth," Institute for Infocoram Research (I2R), School of Computing, National University of Singapore (2004).

(Continued)

*Primary Examiner* — Christopher E Leiby
(74) *Attorney, Agent, or Firm* — Hamilton, Brook, Smith & Reynolds, P.C.

(57) ABSTRACT

An apparatus includes a monocular display with a wireless communications interface, a user input device, a transmitter, receiver and a controller. The controller is configured to control the transmitter for sending and receiving control signals to and from an external device via the wireless interface. The monocular display is positioned relative to the user's dominant eye to display images to the user while occluding less than half of the user's maximum viewing space, while enabling the user to send and receive audible information or music.

54 Claims, 18 Drawing Sheets

(56) References Cited

U.S. PATENT DOCUMENTS

| | | | |
|---|---|---|---|
| 5,815,126 A * | 9/1998 | Fan et al. ..................... 345/8 |
| 5,831,664 A | 11/1998 | Wharton et al. |
| 5,844,656 A | 12/1998 | Ronzani et al. |
| 5,867,817 A | 2/1999 | Catallo et al. |
| 5,873,070 A | 2/1999 | Bunte et al. |
| 5,886,822 A | 3/1999 | Spitzer |
| 5,909,183 A | 6/1999 | Borgstahl et al. |
| 5,949,351 A | 9/1999 | Hahm |
| 5,990,793 A | 11/1999 | Bieback |
| 5,995,936 A | 11/1999 | Brais et al. |
| 6,010,216 A | 1/2000 | Jesiek |
| 6,023,372 A | 2/2000 | Spitzer et al. |
| 6,046,712 A | 4/2000 | Beller et al. |
| 6,073,034 A | 6/2000 | Jacobsen et al. |
| 6,084,556 A | 7/2000 | Zwern |
| 6,091,546 A | 7/2000 | Spitzer |
| 6,108,197 A | 8/2000 | Janik |
| 6,148,241 A | 11/2000 | Ludtke et al. |
| 6,167,413 A | 12/2000 | Daley, III |
| 6,181,304 B1 | 1/2001 | Robinson et al. |
| 6,204,974 B1 | 3/2001 | Spitzer |
| 6,212,020 B1 | 4/2001 | Ahlgren et al. |
| 6,216,158 B1 | 4/2001 | Luo et al. |
| 6,229,503 B1 | 5/2001 | Mays, Jr. et al. |
| 6,232,937 B1 | 5/2001 | Jacobsen et al. |
| 6,292,158 B1 | 9/2001 | Amafuji et al. |
| 6,295,479 B1 | 9/2001 | Shima et al. |
| 6,304,234 B1 | 10/2001 | Horiuchi |
| 6,325,507 B1 | 12/2001 | Jannard |
| 6,339,706 B1 | 1/2002 | Tillgren et al. |
| 6,349,001 B1 | 2/2002 | Spitzer |
| 6,356,392 B1 | 3/2002 | Spitzer |
| 6,356,437 B1 | 3/2002 | Mitchell et al. |
| 6,359,602 B1 | 3/2002 | Amafuji et al. |
| 6,369,952 B1 | 4/2002 | Rallison et al. |
| 6,384,982 B1 | 5/2002 | Spitzer |
| 6,433,760 B1 | 8/2002 | Vaissie et al. |
| 6,445,363 B1 | 9/2002 | Urisaka |
| 6,448,944 B2 | 9/2002 | Ronzani et al. |
| 6,452,572 B1 | 9/2002 | Fan et al. |
| 6,456,892 B1 | 9/2002 | Abrams et al. |
| 6,462,882 B2 | 10/2002 | Chen et al. |
| 6,486,862 B1 | 11/2002 | Jacobsen et al. |
| 6,487,021 B1 | 11/2002 | Ophey |
| 6,507,762 B1 | 1/2003 | Amro et al. |
| 6,522,474 B2 | 2/2003 | Cobb et al. |
| 6,529,331 B2 | 3/2003 | Massof et al. |
| 6,535,182 B2 | 3/2003 | Stanton |
| 6,538,624 B1 | 3/2003 | Karasawa et al. |
| 6,545,654 B2 | 4/2003 | Jacobsen et al. |
| 6,608,884 B1 | 8/2003 | Mazess et al. |
| 6,618,099 B1 | 9/2003 | Spitzer |
| 6,622,018 B1 | 9/2003 | Erekson |
| 6,633,267 B2 | 10/2003 | Numa |
| 6,636,185 B1 | 10/2003 | Spitzer et al. |
| 6,653,989 B2 | 11/2003 | Nakanishi |
| 6,674,493 B2 | 1/2004 | Shaw |
| 6,677,936 B2 | 1/2004 | Jacobsen et al. |
| 6,680,802 B1 | 1/2004 | Ichikawa et al. |
| 6,690,338 B1 | 2/2004 | Maguire, Jr. |
| 6,697,200 B2 | 2/2004 | Nagaoka |
| 6,710,928 B2 | 3/2004 | Roest |
| 6,724,354 B1 | 4/2004 | Spitzer et al. |
| 6,727,865 B1 | 4/2004 | Yonezawa |
| 6,734,834 B1 | 5/2004 | Baram |
| 6,738,535 B2 | 5/2004 | Kanevsky et al. |
| 6,745,253 B2 | 6/2004 | Struble |
| 6,747,611 B1 | 6/2004 | Budd et al. |
| 6,751,026 B2 | 6/2004 | Tomono |
| 6,753,828 B2 | 6/2004 | Tuceryan et al. |
| 6,757,719 B1 | 6/2004 | Lightman et al. |
| 6,762,885 B1 | 7/2004 | Ogasawara et al. |
| 6,771,423 B2 | 8/2004 | Geist |
| 6,771,424 B1 | 8/2004 | Amafuji et al. |
| 6,795,421 B1 | 9/2004 | Heinonen et al. |
| 6,816,314 B2 | 11/2004 | Shimizu et al. |
| 6,822,623 B2 | 11/2004 | Kim et al. |
| 6,825,987 B2 | 11/2004 | Repetto et al. |
| 6,834,192 B1 | 12/2004 | Watanabe et al. |
| 6,847,489 B1 | 1/2005 | Wu |
| 6,853,293 B2 | 2/2005 | Swartz |
| 6,868,360 B1 | 3/2005 | Olstad et al. |
| 6,879,443 B2 | 4/2005 | Spitzer et al. |
| 6,880,931 B2 | 4/2005 | Moliton et al. |
| 6,899,539 B1 | 5/2005 | Stallman et al. |
| 6,900,777 B1 | 5/2005 | Hebert |
| 6,904,570 B2 | 6/2005 | Foote et al. |
| 6,922,184 B2 | 7/2005 | Lawrence |
| 6,947,014 B2 | 9/2005 | Wooten |
| 6,947,219 B1 | 9/2005 | Ou |
| 6,947,975 B2 | 9/2005 | Wong et al. |
| 6,956,614 B1 | 10/2005 | Quintana |
| 6,963,379 B2 | 11/2005 | Tomono |
| 6,963,454 B1 | 11/2005 | Martins et al. |
| 6,966,647 B2 | 11/2005 | Jannard |
| 6,972,735 B2 | 12/2005 | Hebert |
| 6,975,991 B2 | 12/2005 | Basson et al. |
| 6,977,630 B1 | 12/2005 | Donath et al. |
| 6,982,683 B2 | 1/2006 | Stanton |
| 6,987,620 B2 | 1/2006 | Nagaoka |
| 6,999,239 B1 | 2/2006 | Martins et al. |
| 7,001,058 B2 | 2/2006 | Inditsky |
| 7,002,534 B2 | 2/2006 | Park |
| 7,004,582 B2 | 2/2006 | Jannard |
| 7,013,009 B2 | 3/2006 | Warren |
| 7,019,715 B1 | 3/2006 | Kasai et al. |
| 7,038,235 B2 | 5/2006 | Seitz |
| 7,050,078 B2 | 5/2006 | Dempski |
| 7,061,449 B2 | 6/2006 | Oya et al. |
| 7,063,256 B2 | 6/2006 | Anderson et al. |
| 7,075,501 B1 | 7/2006 | Spitzer et al. |
| 7,081,999 B2 | 7/2006 | Yamazaki |
| 7,082,393 B2 | 7/2006 | Lahr |
| 7,088,234 B2 | 8/2006 | Naito et al. |
| 7,088,516 B2 | 8/2006 | Yagi et al. |
| 7,113,151 B2 | 9/2006 | Kinebuchi |
| 7,119,965 B1 | 10/2006 | Rolland et al. |
| 7,121,467 B2 | 10/2006 | Winter et al. |
| 7,126,558 B1 | 10/2006 | Dempski |
| 7,143,785 B2 | 12/2006 | Maerkl et al. |
| 7,145,726 B2 | 12/2006 | Geist |
| 7,147,324 B2 | 12/2006 | Jannard |
| 7,148,860 B2 | 12/2006 | Kooi et al. |
| 7,150,526 B2 | 12/2006 | Jannard |
| 7,155,556 B2 | 12/2006 | Kim et al. |
| 7,158,096 B1 | 1/2007 | Spitzer |
| 7,199,934 B2 | 4/2007 | Yamasaki |
| 7,213,917 B2 | 5/2007 | Jannard |
| 7,216,973 B2 | 5/2007 | Jannard |
| 7,219,994 B2 | 5/2007 | Jannard |
| 7,231,038 B2 | 6/2007 | Warren |
| 7,249,846 B2 | 7/2007 | Grand |
| 7,269,183 B2 | 9/2007 | Morris |
| 7,278,734 B2 | 10/2007 | Jannard |
| 7,302,465 B2 | 11/2007 | Ayres et al. |
| 7,321,354 B1 | 1/2008 | Jacobsen et al. |
| 7,331,666 B2 | 2/2008 | Swab |
| 7,445,332 B2 | 11/2008 | Jannard |
| 7,452,073 B2 | 11/2008 | Jannard |
| 7,458,682 B1 | 12/2008 | Lee |
| 7,461,936 B2 | 12/2008 | Jannard |
| 7,494,216 B2 | 2/2009 | Jannard |
| 7,512,414 B2 | 3/2009 | Jannard |
| 7,542,012 B2 * | 6/2009 | Kato et al. ..................... 345/8 |
| 7,620,432 B2 | 11/2009 | Willins |
| 7,642,990 B2 | 1/2010 | Todd et al. |
| 7,682,018 B2 | 3/2010 | Jannard |
| 7,740,353 B2 | 6/2010 | Jannard |
| 7,744,213 B2 | 6/2010 | Jannard |
| 7,753,520 B2 | 7/2010 | Fuziak |
| 7,760,898 B2 | 7/2010 | Howell |
| 7,798,638 B2 | 9/2010 | Fuziak |
| 7,806,525 B2 | 10/2010 | Howell |
| 7,918,556 B2 | 4/2011 | Lewis |

(56) References Cited

U.S. PATENT DOCUMENTS

| | | |
|---|---|---|
| 7,959,084 B2 | 6/2011 | Wulff |
| 7,966,189 B2 | 6/2011 | Le et al. |
| 7,967,433 B2 | 6/2011 | Jannard |
| 7,969,383 B2 | 6/2011 | Eberl |
| 7,969,657 B2 | 6/2011 | Cakmakci |
| 7,976,480 B2 | 7/2011 | Grajales |
| 7,988,283 B2 | 8/2011 | Jannard |
| 8,010,156 B2 | 8/2011 | Warren |
| 8,020,989 B2 | 9/2011 | Jannard |
| 8,025,398 B2 | 9/2011 | Jannard |
| 8,072,393 B2 | 12/2011 | Riechel |
| 8,098,439 B2 | 1/2012 | Amitai |
| 8,140,197 B2 | 3/2012 | Lapidot |
| 8,184,983 B1 | 5/2012 | Ho et al. |
| 8,212,859 B2 | 7/2012 | Tang |
| 8,378,924 B2 | 2/2013 | Jacobsen |
| 8,812,399 B2 | 8/2014 | Jacobsen |
| 8,825,468 B2 | 9/2014 | Jacobsen et al. |
| 9,116,340 B2 | 8/2015 | Jacobsen et al. |
| 2002/0015008 A1 | 2/2002 | Kishida |
| 2002/0074370 A1 | 6/2002 | Quintana et al. |
| 2002/0094845 A1 | 7/2002 | Inasaka |
| 2003/0068057 A1 | 4/2003 | Miller |
| 2004/0113867 A1* | 6/2004 | Tomine et al. .................... 345/8 |
| 2004/0125047 A1 | 7/2004 | Crane et al. |
| 2005/0136958 A1 | 6/2005 | Seshadri et al. |
| 2005/0219152 A1 | 10/2005 | Budd et al. |
| 2005/0264527 A1 | 12/2005 | Lin |
| 2006/0028400 A1 | 2/2006 | Lapstun et al. |
| 2006/0119539 A1 | 6/2006 | Kato et al. |
| 2006/0132382 A1 | 6/2006 | Jannard |
| 2006/0221266 A1 | 10/2006 | Kato et al. |
| 2007/0048697 A1 | 3/2007 | Du et al. |
| 2008/0055194 A1 | 3/2008 | Baudino et al. |
| 2008/0198324 A1 | 8/2008 | Fuziak |
| 2009/0099836 A1 | 4/2009 | Jacobsen et al. |
| 2009/0128448 A1 | 5/2009 | Riechel |
| 2009/0154719 A1 | 6/2009 | Wulff |
| 2009/0180195 A1 | 7/2009 | Cakmakci |
| 2009/0251409 A1 | 10/2009 | Parkinson et al. |
| 2010/0020229 A1 | 1/2010 | Hershey |
| 2010/0171680 A1 | 7/2010 | Lapidot |
| 2010/0271587 A1 | 10/2010 | Pavlopoulos |
| 2011/0001699 A1 | 1/2011 | Jacobsen et al. |
| 2011/0187640 A1 | 8/2011 | Jacobsen et al. |
| 2011/0254698 A1 | 10/2011 | Eberl |
| 2011/0255050 A1 | 10/2011 | Jannard |
| 2012/0013843 A1 | 1/2012 | Jannard |
| 2012/0068914 A1 | 3/2012 | Jacobsen et al. |
| 2012/0075177 A1 | 3/2012 | Jacobsen et al. |
| 2012/0105740 A1 | 5/2012 | Jannard |

FOREIGN PATENT DOCUMENTS

| | | |
|---|---|---|
| EP | 1 544 665 A1 | 6/2005 |
| EP | 1633146 A1 | 3/2006 |
| JP | 09-504120 | 4/1997 |
| JP | 2009504120 | 4/1997 |
| JP | 10-301055 A | 11/1998 |
| JP | 2010301055 | 11/1998 |
| JP | 2004-080679 A | 3/2004 |
| JP | 2004-358092 A | 12/2004 |
| JP | 2005286927 | 10/2005 |
| JP | 2006-005804 A | 1/2006 |
| JP | 2006005804 | 1/2006 |
| JP | 2006-197734 A | 7/2006 |
| JP | 2006197734 | 7/2006 |
| JP | 2006-217520 A | 8/2006 |
| WO | WO95/21408 | 2/1994 |
| WO | WO95/23994 | 3/1994 |
| WO | WO 95/11473 A1 | 4/1995 |
| WO | WO00/79327 | 6/1999 |
| WO | WO2009/076016 | 12/2007 |
| WO | WO2008/013111 A1 | 1/2008 |

OTHER PUBLICATIONS

Written Opinion of the International Searching Authority, for Application No: PCT/US2008/000245, 13 pages, dated Jul. 23, 2009.
Further Search Report of GB0913858.7 dated Jul. 13, 2011.

* cited by examiner

MONOCULAR DISPLAY DEVICE

CROSS REFERENCE TO RELATED PATENT APPLICATIONS

This application claims priority to U.S. Provisional Patent Application No. 60/880,270 to Jacobsen et al., filed on Jan. 12, 2007, which is herein incorporated by reference in its entirety.

This application also claims priority to U.S. Provisional Patent Application No. 60/930,242 to Jacobsen et al., filed on May 15, 2007, which is herein incorporated by reference in its entirety. This application also claims priority to U.S. Provisional Patent Application No. 60/962,686 to Jacobsen et al., filed on Jul. 31, 2007, which is herein incorporated by reference in its entirety.

Further, this application also claims priority to U.S. Provisional Patent Application No. 60/999,801 to Jacobsen filed on Oct. 19, 2007, which is herein incorporated by reference in its entirety.

BACKGROUND OF THE INVENTION

Head-worn display devices are known in the art. Typically, the display is a small color monitor arranged to present images to a user's left eye, right eye, or both. These devices often surround the user's face or head and thus not only are heavy but also occlude substantially all of the user's vision. In other words, while wearing the display, the user generally cannot easily view other objects in the user's normal peripheral vision or loses substantial portions of normal peripheral vision during use. Other head worn displays may include two separate displays, one for each eye, that are also supported on a heavy frame.

While, these devices can provide a high-resolution display of images and sound, occlusion of the user's normal viewing space, or a majority thereof can be problematic. The user will typically only use the display in a few, select locations where that user perceives the location to be safe, for example, in a living room, elsewhere in the home, in a work space while seated or standing or in a substantially fixed location. Users cannot efficiently perform many other day to day tasks when wearing an occlusive display device. These tasks include participating in activities requiring moderate to high personal mobility, requiring frequent depth perception adjustments, moving through areas with irregular and uneven surfaces or requiring active collision avoidance (i.e., personally moving through areas or events with constantly changing obstacles, crowds, avoiding fast moving objects that may be encountered, while operating vehicles, negotiating the use of public transportation) or any circumstance where personal safety maybe sacrificed by loss of normal peripheral vision.

Secondly, such prior art head worn displays are limiting in certain limited tasks. Such tasks can include viewing images, graphics or movies with audio. This can be for gaming purposes or recreational viewing of images from a television broadcast or video. Such prior art head worn displays are severely limited in connection with other day-to-day desired functional computing tasks. For example, the user may desire using the display in connection with communication tasks, running business applications, active navigation tasks, mobile instruction with real time updates or using the display to wirelessly control other devices that the user regularly uses or comes in contact with on a day to day basis. These devices can include such as, for example, a Personal Digital Assistant, a notebook computer, a desktop computer, a mobile phone, a vehicle, a wireless network, wireless service hot spot, thin client, other electronic device or an appliance. Such prior art head worn displays often cannot interface with or slave such devices to initiate and control running programs, initiate real time device functional changes, alter real time device operational parameters, enable local or remote wireless communication with mobile devices and/or engage with wireless networks and services.

Thirdly, such prior art devices are not readily upgradeable to provide other functions that the user may desire. A user may desire, in some locations, to have some functional attributes of one or more particular software applications or one or more particular hardware configurations, while in other locations the user may not desire to have those software applications or hardware configurations. In fact, the user may not use such a heavy display device with multiple software applications or hardware configurations, and instead may wish to remove unnecessary software and hardware from the device so the device remains ultra lightweight.

Accordingly, there is a need in the art for a monocular device that does not occlude large portions of the user's normal viewing space to prevent or discourage the user from wearing the device in the user's day-to-day normal activities. There is also a need in the art for a device that provides for other functions besides viewing images or graphics and that can be user upgradeable so the user can select and choose which hardware or software components the user desires to interface with the device. There is also a need in the art for a monocular device that only occludes less than about ten to about twenty percent of the user's normal vision, while leaving about eighty to about ninety percent or more of the user's vision free from obstruction. It is appreciated that the wearer has a view of vertical and horizontal vision, and that in one embodiment about eighty to about ninety percent of the wearer's vision in the horizontal is free from obstruction. There is also a need in the art for a device that can be easily moved from a displayed position to a stowed position without removing the device from the wearer's head. There is also a need in the art for a device that does not completely immerse the user in video and audio so the user cannot perform other day to day tasks.

SUMMARY OF THE INVENTION

In a first aspect of the present disclosure, there is provided a head mounted monocular display that includes a display arranged relative to a dominant wearer's eye, a housing connected to the display, and a support member. The support member is connected to the housing, which supports the display relative to the dominant wearer's eye. The display is generally located in a position relative to the wearer's dominant eye so the display is in the peripheral view of the wearer, and does not occlude the wearer's normal peripheral vision by the display blocking a front of the wearer's dominant eye.

In another aspect, there is provided a method of supporting a head mounted display on a wearer. The method includes providing a resilient housing, and connecting the head mounted display to the resilient housing. The housing is supported on the wearer so that the display is in the peripheral view of the wearer, and the display is supported relative to a wearer's head to occlude no more than about ten to about twenty percent of the normal field of view of the wearer. The normal field of view of the wearer is defined as about 180 degrees in the horizontal, and about 120 degrees in a vertical direction.

In yet a further aspect of the present disclosure, there is provided a head mounted monocular display device that includes a display arranged relative to a wearer's eye, a housing connected to the display, a power supply, and a circuit operatively connected to the display and power supply. A support member is connected to the housing, which supports the display relative to the wearer's eye. A port is associated with the display, the housing or the support member. The port operatively connects a functional component to the circuit for removably connecting at least one additional functional component to the circuit.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1A:
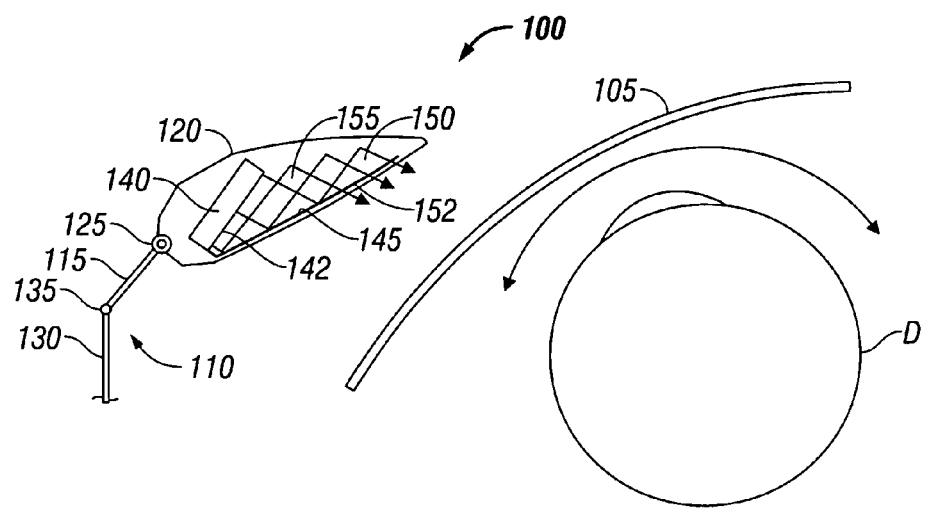
FIG. 1A shows a monocular display device according to the present disclosure including an eyeglass optical element placed in a front of the user that displays an image in front of the user on the optical element.
Figure 1B:
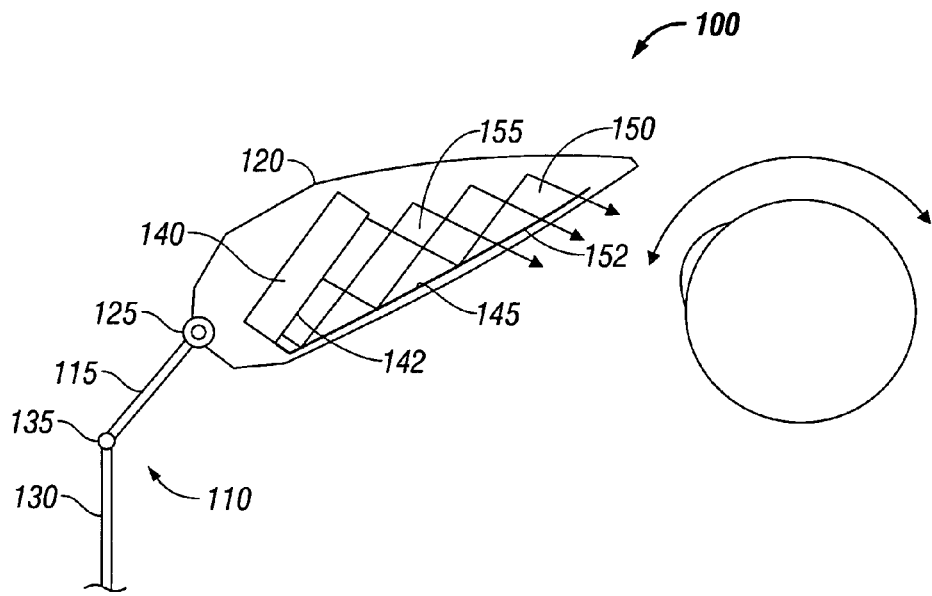
FIG. 1B shows an alternative embodiment of the monocular device with a prism optical element with the display being in a position relative to the user's dominant eye that only occludes about ten to about twenty percent of the user's maximum peripheral vision.

Turning now to FIG. 1A and FIG. 1B, there is shown an embodiment of a monocular display device 100. The monocular display device 100 preferably is a lightweight computing device that can be disposed in proximity to a user's dominant eye to view images. This contrasts with prior binocular and monocular display devices, which wrap around or are positioned in front of a pair of the user's eyes thereby occluding all or nearly all of the user's vision. The present monocular display device 100 preferably is disposed offset relative to only the user's dominant eye, and even in that location the device 100 does not occlude all of the dominant eye's normal vision.

In the preferred embodiment, a housing 210 (FIG. 2D) may include a computing device that includes an Advanced RISC Machine (ARM)/Digital Signal Processor (DSP) (not shown) (which may be a DaVinci series TMS320 processor, available from Texas Instruments of Dallas, Tex.), one or more memory chips (not shown), a Bluetooth interface, a display driver (which may, for example, be an SSD1508 display driver available from Kopin Corporation of Westborough, Mass.), one or more video level shifter circuits, a power supply (i.e., provided by a battery), a universal receiver transmitter (UART) (such as may be used for debugging) and a memory (not shown).

A number of buttons and an LED may be associated with the device 100 and protrude from housing 210 or other locations (e.g., switch 1/switch 2/switch 3 and reset inputs). A VGA quality display 140 is shown in FIG. 1, and an audio input and output device(s), which may include microphone input and stereo outputs may also be housed in the housing 210. A Secure Digital (SD), eXteme Digital (xD), USB integral SD (uSD) memory or other similar interfaces may be stored in the housing 210, and may be used to store application programs, kernel directives, or configuration data, and/or connect to external devices, such as, for example, a digital camera.

Turning again to FIG. 1, the user generally has a total field of view being defined as about 180 degrees or so in the horizontal, and another 120 degrees of view or so being measured in the vertical in a goggle format due to the contribution of each of the viewer's eyes. This defines the total field of view of the viewer in both the horizontal and in the vertical in degrees. Preferably, the monocular display device 100 only occludes about five to ten percent of the user's vision, and is placed, in one embodiment, facing a user's temple so as to be only in the peripheral vision of the user. Shown in FIGS. 1A and 1B, the monocular display device 100 is disposed adjacent one of the user's temples or in a location adjacent to the user's dominant eye and is not directly in front of the user's face nor is the device 100 directly in front of both eyes to substantially occlude the user's vision. Several spacing arrangements are envisioned, and the present invention is not limited to any specific spacing from the eye, and several different ranges are envisioned.

Moreover, the monocular display device 100 can be advantageously viewed simply by looking out of the corner of the user's dominant eye momentarily to view images, and then immediate return to the field of vision in front of the user. This enables that the user can wear the monocular display device 100 in day-to-day activities. Advantageously, the user's can quickly look at the display 100 and then quickly, safely and easily regain focus to objects that are in front of the user. This is advantageous since the user can use the monocular display device 100 in the user's day-to-day tasks and is not confined to using the device 100 only in certain designated "safe" locations. The user's dominant eye is defined as the right or left eye that is the strongest or dominant in the user's day-to-day vision.

FIG. 1A shows a first embodiment of the monocular display device 100 using an eyeglass optical display 105. In this embodiment, the monocular display device 100 may operate to project images onto a screen, grating, or optical element 105 to permit the user to view images. The eyeglass optical display 105 is preferably a clear optical component or lens for which to project images from the monocular display device 100. In this manner, the monocular display device 100 may project an image on to a portion of the eyeglass optical display 105 which may be worn by the viewer, such as a pair of glasses. In this embodiment, the monocular display device 100 includes a support structure 110 configured to provide support for the monocular display device 100 in a location so as to be in the peripheral view of the user's dominant eye.

In this embodiment, the support structure 110 may be any device for quickly and easily permitting the monocular display device 100 to be stowed from a viewing position or located adjacent the user's dominant eye D to a second, or stowed, position. In this aspect, the monocular display device 100 includes a first arm 115. The first arm 115 is a tubular resilient member that is connected to the optical display housing 120 by a hinge 125. The support structure 110 also includes a second arm 130 that is connected to the first arm 115 by a second hinge 135. In this manner, the second arm 130 may be connected to another structure associated with, or worn around the user's head, ear, or connected to a garment for support. The user may quickly and easily move the display housing 120 to the stowed position using the support structure 110. Structure 110 is made from a lightweight material such as aluminum or a thermoplastic.

The monocular display device 100 also includes a display component 140 that will be discussed in detail herein. The display component 140 is preferably a lightweight display that projects an image that is magnified. Turning to FIG. 1A, the display component 140 is positioned relative to a prism optical element 155 in the display housing 120. In this manner, the image is emitted from the display component 140 and is brought into user focus and is substantially corrected for optical distortion, astigmatism, and chromatic aberrations. This generates an optically magnified and enhanced virtual image by the combined influence of the entrance surface 142, the first and second reflective surfaces 145, 150 and an exit surface 152 of the prism optical element 155. The optically enhanced virtual image is then directed to the eyeglass optical component 105 (FIG. 1A) such that the user can view the virtual image by looking directly on the eyeglass optical component 105.

It should be appreciated that the displayed image need not be projected to, or displayed on, the entire eyeglass optical display 105. Instead, the image can be displayed only on a portion of the display 105. This provides that the image itself does not occlude the user's vision. This permits the user to see about ninety to ninety five percent of the user's normal vision through the eyeglass optical element 105.

Turning now to FIG. 1B, there is shown an alternative embodiment of the monocular display device 100 of FIG. 1A. In this embodiment, the monocular display device 100 does not project an optically enhanced virtual image on the eyeglass optical display 105 (FIG. 1A) but instead directly displays the optically magnified and enhanced virtual image to the user's dominant eye D. The monocular display device 100, in this embodiment, is made without any element or screen positioned in front the user's dominant eye D. Instead, the monocular display device 100 includes a housing 120 that forms part of the display, and the optically magnified and enhanced virtual image is projected directly to the user's dominant eye D. In this aspect, the monocular display device 100 includes an optical element 155 that optically magnifies and reflects the virtually enhanced image to the user's dominant eye.

In one embodiment, the monocular display device 100 includes a display that is a micro-display component 140 such as, for example, a liquid crystal display, a light emitting diode display, an organic light emitting diode based display, a cholesteric display, a electro-luminescent display, an electrophoretic or an active matrix liquid crystal display. Various lightweight and high-resolution display configurations are possible and within the scope of the present disclosure.

In one preferred embodiment, the display component 140 may be a WVGA display sold under the trade name "CYBERDISPLAY WVGA LV"® manufactured by the instant Assignee. The display component 140 can be a color filter, wide format, active matrix liquid crystal display having a resolution of 854×480. The display component 140 in this embodiment can be 0.54 inches in the diagonal dimension. In another embodiment, the display component 140 may alternatively include a VGA display sold under the trade name "CYBERDISPLAY VGA"® which is also manufactured by the instant Assignee. The display component 140 can be a color filter, active matrix liquid crystal display having a resolution of 640×480. The display component 140 in this embodiment can be about 0.44 inches in the diagonal dimension and lightweight.

In a further embodiment, the display component 140 can be a 0.44 inch diagonal SVGA display with about 800×600 resolution, a wide SVGA display with about 852×600 resolution, an XVGA display with about 1,024×768 resolution, an SXGA display with 1,280×1,024 resolution or High Definition Television display with either 1,400×720 resolution or full 1,920×1,080 resolution.

In an embodiment shown in FIG. 1B, the display component 140 is positioned relative to a prism optical element 155 in the display housing 120. In this manner, the image is emitted from the display component 140 and brought into the user's focus. This image is substantially corrected for optical distortion, astigmatism, and chromatic aberrations in the generation of an optically magnified enhanced virtual image by the combined influence of the entrance surface 142, the first and second reflective surfaces 145, 155 and the exit surface 152 of the prism optical element 155. The optically enhanced virtual image is then directed to the user's dominant eye D.

Like the embodiment of FIG. 1A, the monocular display device 100 includes a support structure 110 for both supporting and manipulating the display to a comfortable viewing position. The support structure 100 includes a first arm 115. First arm 115 has a pivot 125 that is connected to the monocular display device 100. The first arm 115 also has a second pivot 135 connecting the second arm 130 with the first arm 115. The first arm 115 is adapted to move and rotate relative to the display housing 120 to move the display housing 120 between the stowed position and the display or viewing position. Moreover, in one embodiment, the first arm 115 may be disposed in a telescoping relationship with respect to the second arm 130. In another embodiment, the first arm 115, the second arm 130 may be further connected to a reticulating network of arms 115, 135 so as to be moveable in multiple directions and planes. In one embodiment, the network may be sufficiently long so the display housing 120 is supported around the belt of the wearer.

Turning now to FIGS. 2A through 2G, the monocular display device 200 preferably includes the ability to use an input/output device (not shown) to control the monocular display device 200. Using the input/output device, the monocular display device 200 may form a master/slave relationship with other devices using a wired or wireless link or interface. This interface may include a BLUETOOTH® wireless interface protocol, Wi-Fi, a cellular interface, an infrared interface, a television broadcast interface, a closed circuit connection interface, a radio broadcast interface, a satellite wireless interface, a USB wired interface, RS-232 and/or RS-485 wired interfaces, an Ethernet interface, a telephone line interface, a modem interface, a digital subscriber line interface, a cable interface, or a personal area network interface. In this manner, a user may use the input/output device together with the monocular display device 200 to control other suitable devices using a master/slave relationship such as a notebook or desktop computer, a Personal Digital Assistant, an appliance, a network device, a music player, an audio or video device, a Global Positioning System device, a mobile device, a digital camera, a video camera, an audio device or any other type of digital or analog device.

The present monocular display device 200 preferably has program instructions stored on a memory to form a computer networking master/slave relationship with other devices using a communication protocol in which the monocular display device 200 controls one or more other devices or processes, and once the master/slave relationship is established, the direction of control is directed from the monocular display device 200 to the desired components. In this manner, the user need not carry heavy secondary components and may simply control those secondary components using the primary lightweight monocular display device 200 over a wireless interface.

In that aspect, the monocular display device 200 may include a processor (not shown), a memory, and a bus including a wireless interface. The wireless interface may include a transmitter/receiver or transceiver and be compatible for communications with personal area networks and such devices using short-range radio frequency signals. In one preferred embodiment, the wireless interface may communicate using a BLUETOOTH® radio standard, flexible Ultra Wideband (UWB) or using other radio frequency communication standards for low or flexible power consumption and compatibility. In another embodiment, the monocular display device 200 may communicate using Wi-Fi.

Figure 2A:
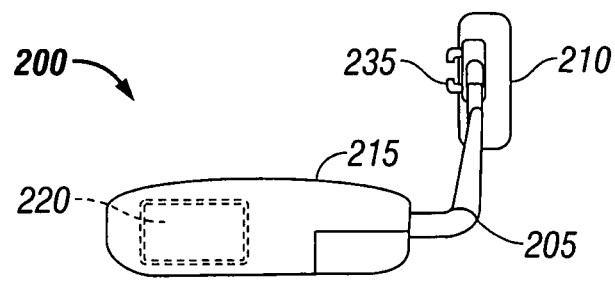
FIGS. 2A through 2G show various views of a monocular display device for use with eyeglasses with the device including an audio device.

Turning now to FIG. 2A showing a front view of another embodiment of the monocular display device 200 where the monocular display is a two-part member for engaging eyeglass, goggles, or similar eyewear. In this embodiment, the monocular display device 200 includes a housing 205 that is substantially "L" shaped. The housing 205 has a first portion 210 that preferably engages or hooks to a portion of the wearer, and a second portion 215 that supports the display 220.

Figure 2B:
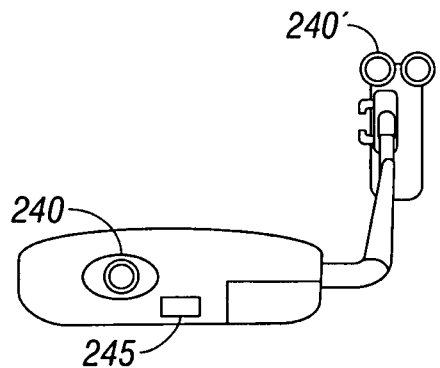
Figure 2C:
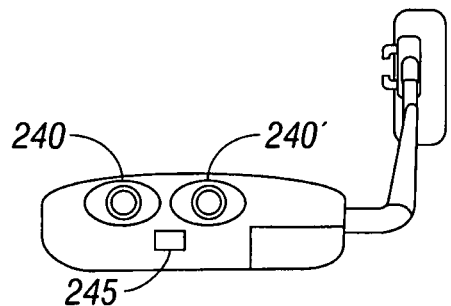
Figure 2D:
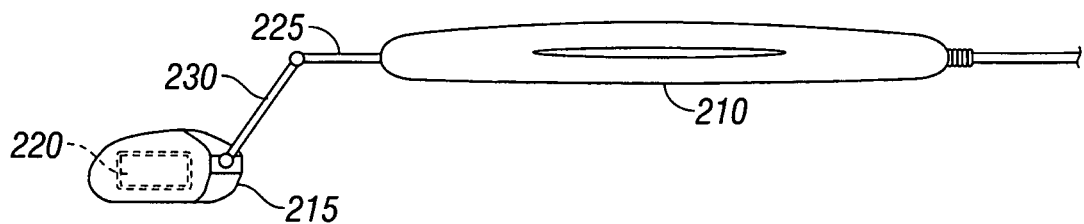

Referring to FIG. 2D, the second portion 215 supports the display 220. The monocular display device 200 also includes first and second arms 225, 230 that are positioned between the first and the second portions 210, 215 to connect the first portion 210 to the second portion 215. In this embodiment, the first portion 210 may be configured to include a resilient sleeve that has a through-aperture along a longitudinal axis that slides over or attaches to a pair of ordinary sunglasses or reading glasses. In another embodiment, the first portion 210 may include an ear hook for wrapping around an ear of the wearer. In another embodiment, the first portion 210 may include a clip for clipping to a portion of the wearer or the wearer's garments. Various support configurations are possible and within the scope of the present disclosure.

Turning again now to FIG. 2A, there is shown a front view of the monocular device 200. The first portion 210 includes a clip 235 for clipping the first portion 210 to a pair of eyeglasses. The monocular display device 200 may further include a camera 240 (FIG. 2B). The camera 240 may include any lightweight digital camera known in the art and can be positioned opposite the display 220 on a frontal portion of the second portion 215. Likewise, a second camera 240' may be positioned in a rear or in an opposite direction relative to the first camera 240. In this manner, the monocular display device 200 may capture images using either the first or the second digital cameras 240, 240' for displaying the captured images using the display 220 discussed in FIG. 1A, or for storing the images in a memory. The monocular device 200 may further include a microphone 245 disposed on the frontal portion of the second portion 215. The microphone 245 may be a lightweight digital audio device that converts the captured audio into data, which is then communicated to the monocular display device 200. In one embodiment, the microphone 245 may include a noise-canceling microphone 245, MEMs microphone, a remote microphone, or a microphone that detects acoustic vibration from a skeletal structure. The microphone 245 may also be configured for use as the input/output device used to control the operation of the monocular display device 200 using a suitable operating system loaded on a memory.

Turning now to FIG. 2C, the monocular device 200 may be fabricated with multiple digital cameras 240, 240'. Cameras 240, 240' may be positioned together or in various different locations relative to one another. The monocular device 200 may also include others sensors. Sensors may detect one or more parameters of operation and be configured to relay detection of those parameters to the monocular display device 200 or a digital signal processor associated with the monocular display device 200. In one embodiment, the monocular display device 200 may include sensors and be configured to detect motion, light, rain, or other sensory or environmental parameters and then communicate those parameters to the processor. In response, the processor may receive these indications and then commence operation of one or more programs in response to the indication from the sensors. Sensors may be associated with the camera 240, 240' and be positioned on either the first portion 210 or the second portion 215 or both the first and the second portion 210, 215.

Figure 2E:
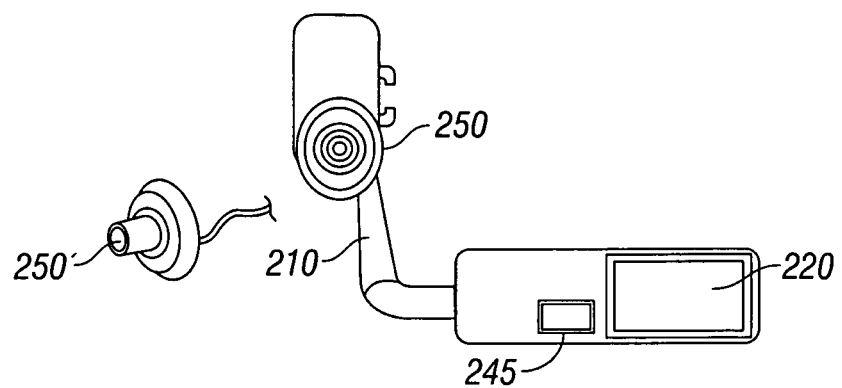
Figure 2F:
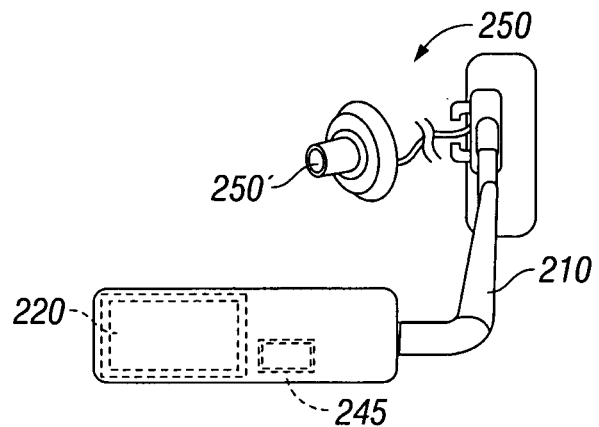
Figure 2G:
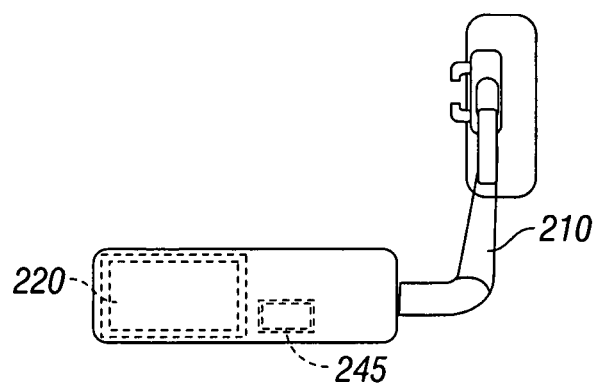

Turning now to FIGS. 2E through 2G, the monocular display device 200 may also be configured to playback saved data in an audio format. The monocular display device 200 may be configured to receive data files in an audio format and playback those files using an audio speaker system 250. The audio speaker system 250 preferably is operatively connected to the monocular display device 200 and can playback audio. The audio speaker system 250 is configured to be lightweight and include an ear bud 250' that may be connected in a wired manner as shown or may be configured to include a wireless communication device to transmit audio wirelessly. In another embodiment, the speaker system 250 may be configured as a single wired headphone that may be retractable into the first portion 210. It should be appreciated that the audio device 250 may also be configured as an integrated speaker that is built into a panel located on a lateral side of the first portion 210, located on or over the ears, include removable ear buds, include a skeletal audio transmission configuration, or include noise cancellation functions. Various audio device 250 configurations are possible and within the scope of the present disclosure.

Figure 3A:
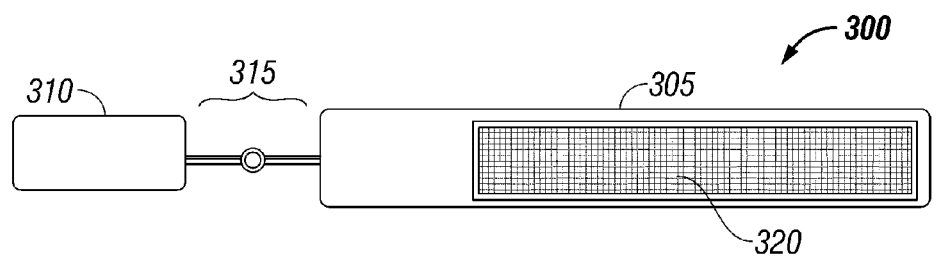
FIGS. 3A and 3B show alternative embodiments of the display housing including a solar cell module and an electromagnetic (EM) energy field antenna for harvesting electromagnetic energy to recharge display system battery.
Figure 3B:
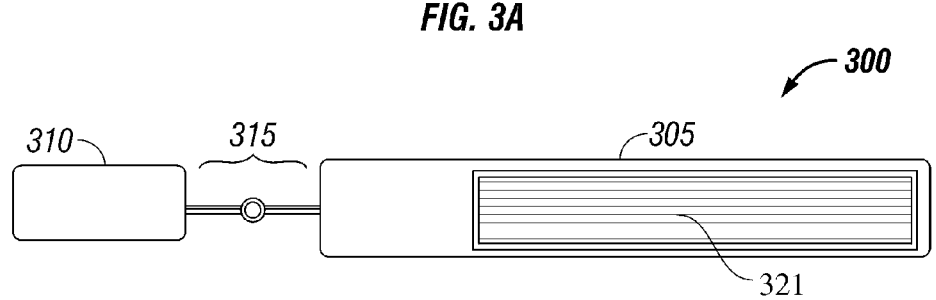

Turning now to FIGS. 3A and 3B, there is shown an alternative embodiment of the monocular display device 300 that includes a first body portion 305 and a second body portion 310 that are connected to one another using a support structure 315. The first body portion 305 and the second body portion 310 are shown in the retracted or stowed position. This embodiment may be configured so the second body portion 310 may be pulled relative to the first body portion 305. This places the second body portion 310 with the display (not shown) in the viewing position as discussed above.

In this alternative embodiment, positioned on the first body portion 305, is a power supply 320. The power supply 320 may include various differently compact power devices such as, for example, a battery or a wired connection. However, in this non-limiting embodiment, the power supply 320 may be configured to include a different rechargeable power source. In this embodiment, the power supply 320 can be configured as a solar photovoltaic rechargeable cell. The power supply 320 configured as the solar cell may be further configured as the primary power source for the monocular display device 300 or may alternatively be configured as a secondary or auxiliary power source. Various configurations are possible and within the scope of the present disclosure.

Preferably, the power supply 320 is positioned in a complementary location so as to receive sunlight, artificial light or may be rotated to such a recharging position to receive light using the support structure 315. Turning now to FIG. 3B, the monocular display device 300 may alternatively include another different power supply such as, for example, an electromagnetic field coil rechargeable antenna component 321.

Preferably, in this embodiment, the electromagnetic field coil rechargeable antenna component 321 includes a battery component (not shown) that is operatively connected to the electromagnetic field coil rechargeable antenna component 321. The electromagnetic field coil rechargeable antenna component 321 preferably captures energy from a transmitted or received magnetic fields and stores the captured energy in the battery component. These fields may be from a cell phone or wireless mobile device that the wearer carries.

The electromagnetic field coil rechargeable antenna component 321 may be configured for use in a sealed casing for primary power or configured for auxiliary power. The electromagnetic field coil rechargeable antenna component 321 preferably includes a transformer with a coil that captures the electromagnetic field for use by the device 300 and/or can be used with the embodiment of FIG. 3A. The electromagnetic field coil rechargeable antenna component 321 preferably is lightweight and may easily be worn with repeated use directly on the monocular display device 300. In one aspect, the electromagnetic field coil rechargeable antenna component 321 may be configured to capture electromagnetic fields or Tesla fields associated with a mobile phone, BLACKBERRY™ communication device, Personal Digital Assistant or similar communication device(s) using radio frequency energy.

Turning now to FIGS. 4A through 4F, in another embodiment of the monocular display device 400, the device 400 includes a display housing 405 that may be rotatably stowed adjacent to a first body portion 410. Similarly, and as described with regard to the above mentioned embodiments, the monocular display device 400 includes a first arm 415 that is rotatably connected to the display housing 405 and may telescopically traverse outwardly relative to the first body portion 410. As shown, the display housing 405 is manipulated (manually or automatically) and the first arm 415 moves the second arm 420 into the first body portion 410.

Figure 4A:
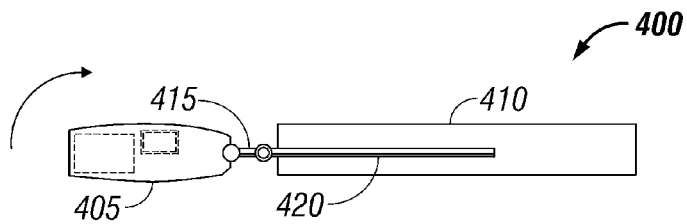
FIGS. 4A through 4F show the monocular display device connected to a conventional eyeglass frame.
Figure 4B:
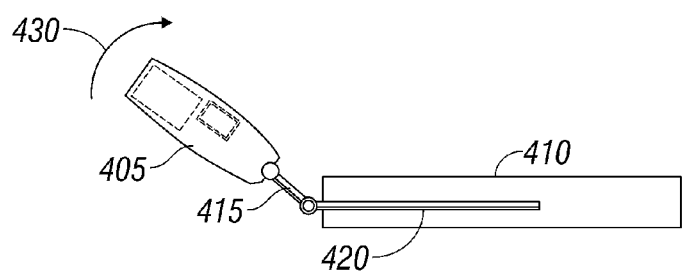
Figure 4C:
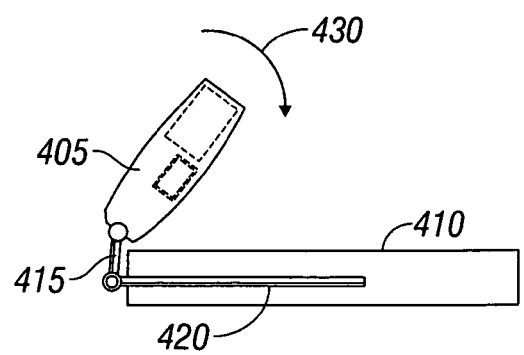
Figure 4D:
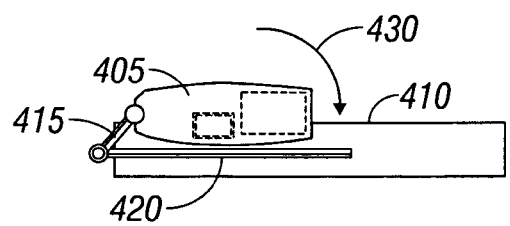
Figure 4E:
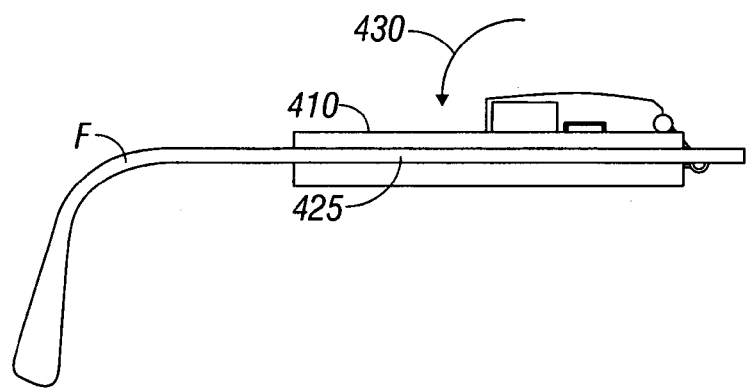
Figure 4F:
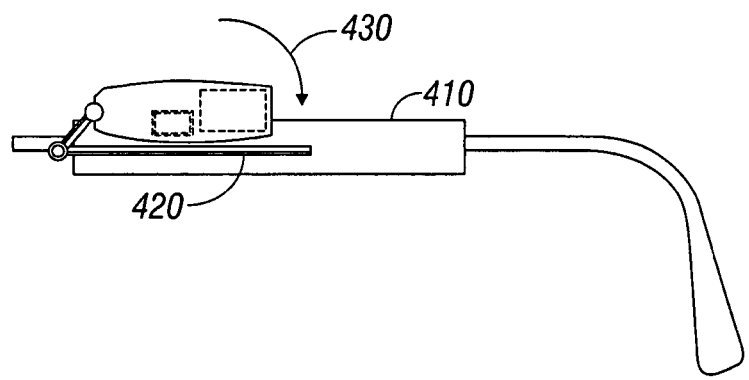

As shown in FIGS. 4E and 4F, the first body portion 410 may include an engagement structure 425 for removably clipping the first body portion 410 to a conventional eyeglass frame F. Once the second arm 420 is pushed in the first body portion 410, the display housing 405 may be then rotated in the direction of reference arrow 430 to be stowed adjacent to the first body portion 410, which is clipped onto a conventional eyeglass frame F. In another embodiment, instead of using a clip, the first body portion 410 may be an integral member with the frame F.

It should be appreciated that other peripheral or secondary components may not be desired to be located on frame F. Additional peripheral components may cause the device 500 to become heavier and uncomfortable, or cause the frame F to fall from the user's face. In this aspect, the monocular display device 400 further includes a lanyard strap interface 520 (FIG. 5A) with an interior (not shown) that houses one or more electronic components for wired, fiber optic interface, or wireless connection to the monocular device 500. The lanyard interface 520 preferably provides increased functionality by allowing the user to store one or more additional devices or components therein 520 for use with the monocular display device 600 without adding weight to the frame F.

In this embodiment, the lanyard interface 520 may provide additional features for the monocular device 500 that permit the lanyard interface 520 to carry slightly heavier items that would not be appropriate for housing in the display housing 405 or the body 410. In this aspect, the lanyard interface 520 may provide additional features such as increased battery life, increased memory functions, increased sensing features or other previously described components or new different components. The lanyard interface 520 preferably connects to either side of the eyeglass frame F, but also has an interior and provides for space for the additional components. The lanyard interface 520 may include wiring to a secondary auxiliary battery, additional sensors, additional rear view cameras, a lightweight solid-state memory, a bus, or a processor.

In another aspect, the lanyard interface 520 may act as a pass-through for wiring components to the other opposite eyeglass frame F. In this aspect, the lanyard 520 may communicate with an auxiliary secondary housing that is removably connected to the opposite eyeglass frame F by a different clip or fastener.

Figure 5A:
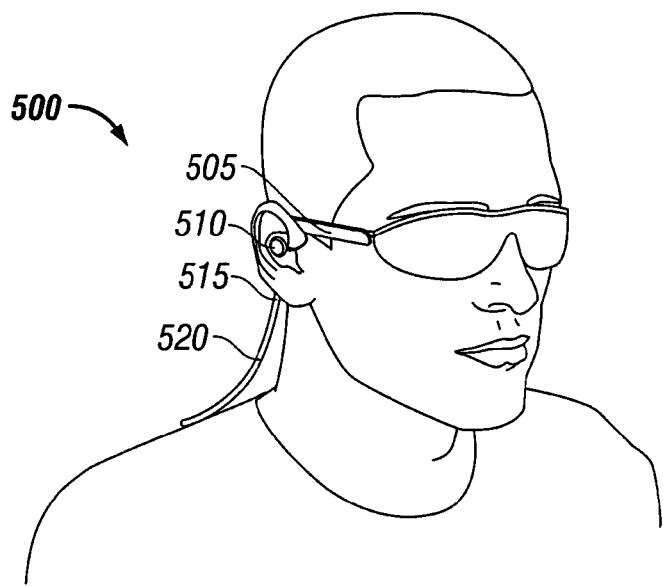
FIGS. 5A through 5C show the monocular display device including an audio device and an upgradeable component in an auxiliary housing on an opposite eyeglass frame.
Figure 5B:
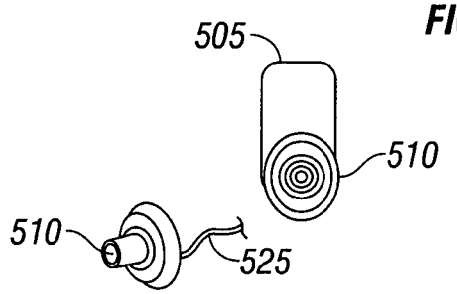
Figure 5C:
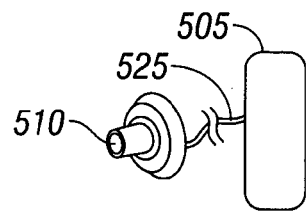

Turning now to FIG. 5A through 5C, there is shown still another embodiment of the monocular display device 500. In this embodiment, the opposite side of the wearer is shown. In this embodiment, the monocular device 500 includes a secondary auxiliary housing 505. The secondary auxiliary housing 505 is generally a lightweight orthogonal shaped member that may be removably and firmly connected to the opposite eyeglass frame F of the wearer. In this manner, the user can store one or more primary/secondary components of the monocular display device 500 without adding additional weight to the monocular display device 500 on the opposite side. Preferably, the secondary auxiliary housing 505 includes an engagement structure or clip similar to that described above for the body portion previously described. Secondary auxiliary housing 505 may be connected to the monocular display device housing as well, and does not need to be separated from the device.

Alternatively, the secondary auxiliary housing 505 may be configured to connect to other locations. In one embodiment, the housing 505 can be located to hang from a wearer's hat, eyeglasses or may even hook around or wrap around the wearer's ear. In another embodiment, the auxiliary housing 505 may wrap around the user's wrist, ankle, arm, leg, or bicep/tricep muscle. The secondary auxiliary housing 505 preferably increases the functionality of the monocular display device 500 by storing one or more additional or secondary components that provide increased functionality to the monocular display device 500.

In the embodiment of FIG. 5A, the secondary auxiliary housing 505 may house a second audio device or speaker 510, or provide increased auxiliary or primary power by housing a primary/auxiliary power supply in housing 505. The secondary auxiliary housing 505 may be wired to the monocular display device 500, be located on an opposite eyeglass frame, or be wired by a lead that is positioned through the lanyard interface 520. The housing 505 may alternatively have a wireless interface to communicate with the monocular display device 500 which is located clipped to an opposite eyeglass frame.

In the embodiment of FIG. 5A through 5C, the secondary auxiliary housing 505 may include an ear bud 510 that is connected to the secondary auxiliary housing 505 by a retractable wire 525. In yet another embodiment, ear bud 510 may be connected to a housing 505 in a wireless manner and is configured to recharge when stowed. As shown, in the rear view of FIG. 5B, the second auxiliary housing 505 may include a spool (not shown) disposed therein. The wearer can pull the ear bud 810 wrapped around the spool to position the ear bud 510 in, on, or over the wearer's ear for listening.

Figure 6:
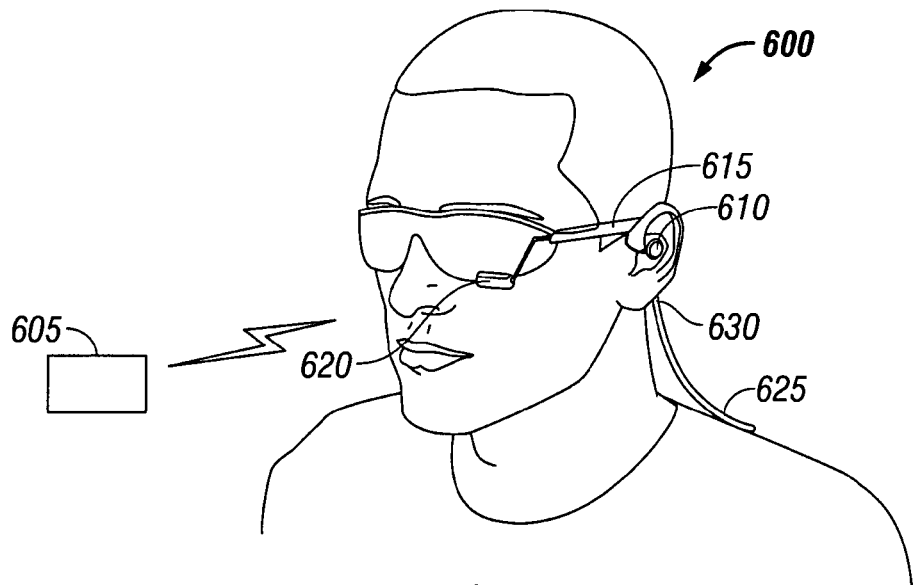
FIG. 6 shows a side view of the monocular display device connected to an eyeglass frame and disposed on a wearer with the display in the viewing position with an audio device.

In the embodiment shown in FIG. 6, the monocular display device 600 may be configured for wireless communication with a mobile telephone, a computer, a peer-to-peer telephone, or Personal Digital Assistant such as, for example, a PALM TREO™ or BLACKBERRY™ communication device or a similar communication device using a wireless protocol. The wearer may receive and make voice calls, text messages, or e-mails through the monocular device 600 by controlling an external mobile device using a wireless interface and forming a master/slave networking relationship with such devices. For example, the wearer may listen to the voice calls using the audio device 510 associated with the secondary auxiliary housing 505 shown in FIG. 5A.

In one embodiment, the wearer may further use a wireless input/output device in order to control the monocular display device 600. In one aspect, the wireless input/output device 605 may include a wireless mouse, a wireless trackball, a wired mouse, a wired trackball, a microphone, a wireless/wired touchpad device or a combination of these input/output features. As can be seen, from FIG. 6, the wearer using the speakers 610 (located in or connected to body portion 615) and using the secondary auxiliary housing (not shown) can listen to audio and view video images using display 620 while still having ninety to ninety-five percent of the vision being virtually unobstructed. In the embodiment shown in FIG. 6, the monocular display device 600 includes a lanyard interface 625 and the lanyard interface 625 may act as a conduit for which a lead 630 may pass through to communicate with the secondary auxiliary housing (not shown).

Figure 7:
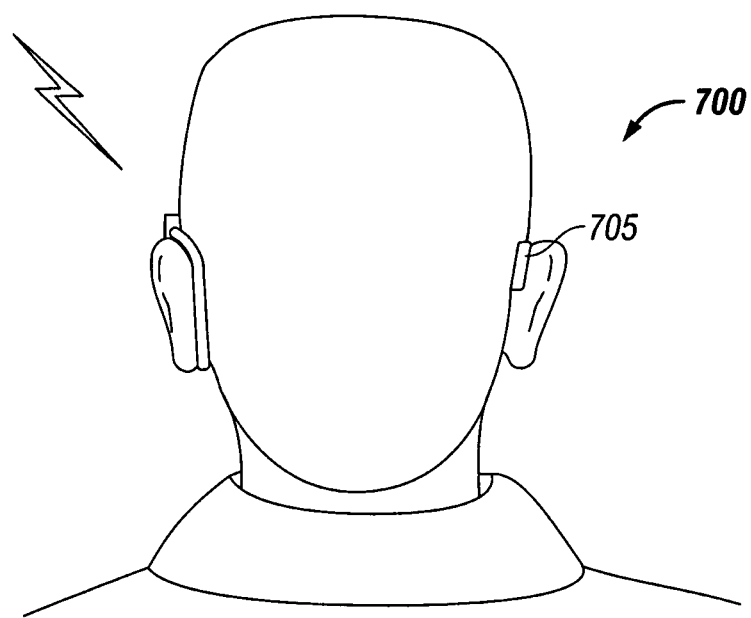
FIG. 7 show a rear and a perspective view of the monocular device of a first embodiment.

In an alternative embodiment shown in a rear view of FIG. 7, the monocular display device 700 may be configured to not include a lanyard interface or any lead communicating with any secondary auxiliary housing. Instead, the device 700 can be configured to wirelessly communicate with a secondary auxiliary housing 705 using radio frequency signals in a wireless communication protocol. In this aspect, the monocular display device 700 may be configured to include a transmitter/receiver or transceiver to communicate without a wired connection as shown in FIG. 7.

Figure 8:
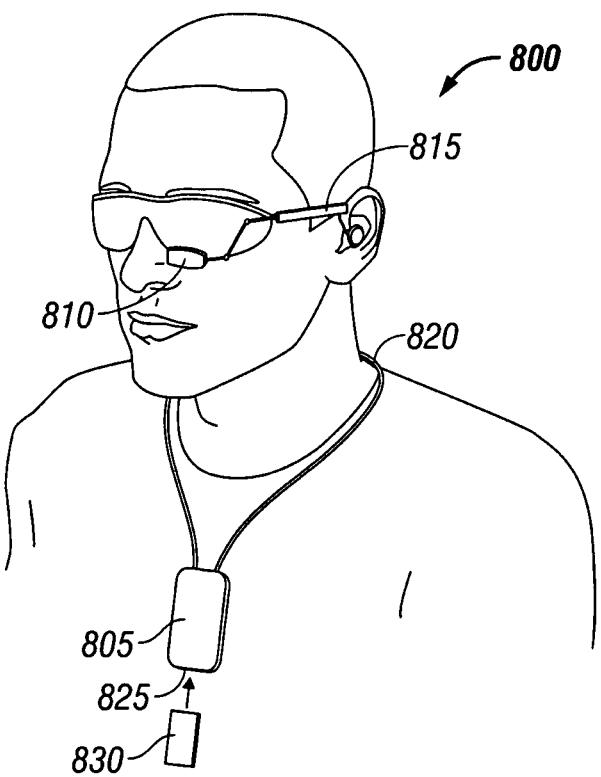
FIG. 8 shows an alternative embodiment of the present monocular device having a multifunctional medallion that interfaces with the monocular device.

FIG. 8 shows another alternative embodiment of the present disclosure where the monocular display device 800 further includes a multifunctional medallion 805. The medallion 805 is an electronic device that can be controlled by the monocular display device 800 and that increases the functional capabilities of the device 800 without adding weight to the device 800 so the device 800 may remain compact and lightweight. The medallion 805 is an auxiliary secondary component for use with the monocular device 800 in a networked master/slave relationship. The medallion 800 may include several optional components. These secondary components may be readily operable with the monocular device 800 and add functionality to the monocular device 800. In one aspect, the medallion 805 may be orthogonally shaped and supported around the neck of a wearer using a band 820. The medallion 805 may include a processor, a memory having an operating system, and bus or a system, internal, external, or a Peripheral Component Interconnect ("PCI") bus. The medallion 805 may further include a transmitter/receiver or transceiver (not shown) in order to wirelessly communicate with the monocular device 800 in a wireless network.

In another embodiment, the medallion 805 may include discrete peripheral components. These can include a device such as an input/output device, a secondary hard drive, a secondary memory, a radio-module or components, a television or video broadcast components, sensors, optical drives, disk drives, removable media, or other intermediary components for which to communicate with other primary computing components that are located in the monocular display device 800.

Such components may also include antennas, cameras, compasses, positional status components, head position sensor components, Global Positioning System components, targeting components, audio components, video components such as graphics cards, bar code readers, radio frequency identification components, user condition monitoring components, temperature sensing components, accelerometers, gas or biological sensing components or other components that can improve user functionality of the device 800. In another embodiment, the medallion 805 may include primary components that communicate with, and control the display 810.

As shown, in FIG. 8, the medallion 805 may further include a component slot 825. The slot 825 may be suitable for which to introduce either additional removable component(s) 830 to the medallion 805 (to be controlled by the monocular device 800) or alternatively for expansion of the already present capabilities of the medallion 805/monocular device 800. In the embodiment of FIG. 8, the components 830 that may be introduced into the slot 825 of the medallion 805 include auxiliary or primary batteries, a digital memory, cards, mini-secure digital memory cards, hard drives or secure removable media, electronic modules, solid state memory, or other components.

Figure 9:
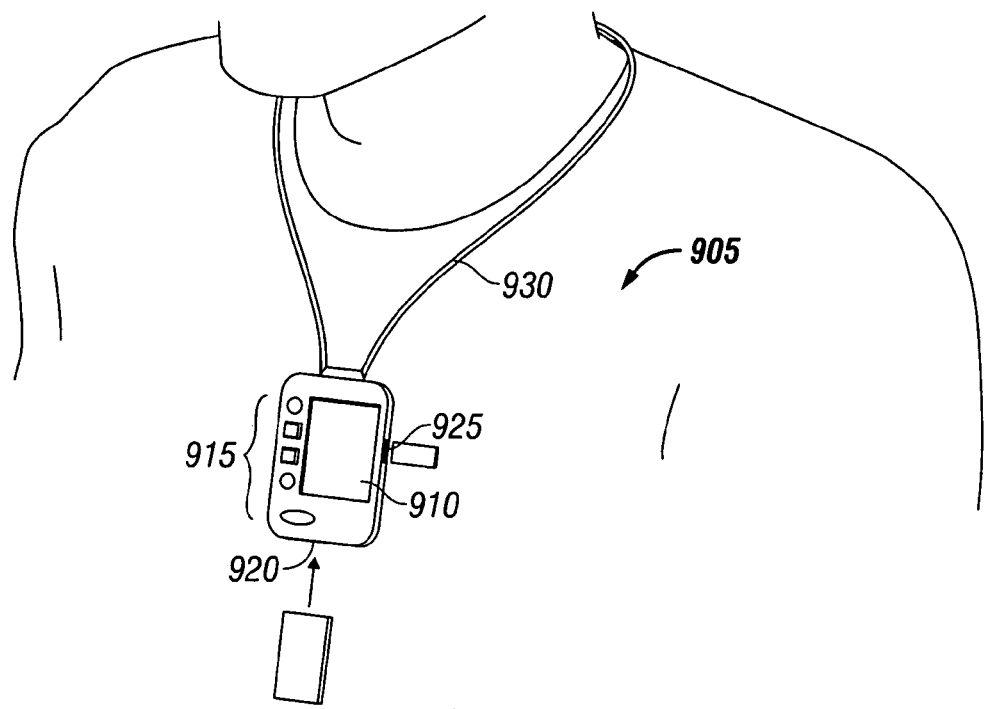
FIG. 9 shows another embodiment of the monocular display device including a medallion having a number of slots for interfacing with other components to upgrade the monocular display device.

Turning now to FIG. 9, there is shown an alternative embodiment of the electronic medallion 905 for use with the monocular display device. The medallion 905 in this embodiment includes a display 910 with a number of input buttons 915 and a first component slot 920 and a second component slot 925. Two slots 920, 925 are shown simply for illustration purposes, and there may be any number of slots or ports 920, 925 located on the electronic medallion 905. The display 910 may be an operational touchpad display 910 to operate one or more components of the monocular display device 900, the medallion 905 or both, or may operate as the input/output device for controlling the monocular display device 900 (FIG. 8).

The medallion 905 is a lightweight device that provides additional functionality to the monocular display device 800. As previously stated above, a normal field of view of the wearer is defined as about 180 degrees in the horizontal, and about 120 degrees in a vertical direction. Also previously stated is that the housing is supported on the wearer so that the display is in the peripheral view of the wearer, and the display is supported relative to a wearer's head to occlude no more than about ten to about twenty percent of the normal field of view of the wearer. Based on these numbers, the display can be of certain dimensions at particular distances from the eye. For example, based on trigonometry and geometry, a field of view a distance x from the user's eye can be calculated as the surface area of a cross-section of a half-sphere a distance D from the user's eye, where the cross section cuts off an area of the half-sphere proportional to the field of view and occupies a finite area based on an area A based on the field of views defined above, where the field of view is represented by θ, and a represents a length of the display. The area of the display can be represented by:

$$A = x*y$$

where x is the length of display and y is the height. Further, the area of the cross section can be represented by:

$$A = 2\pi Dh$$

where h is equal to $$h = D - \sqrt{D^2 - a^2}$$

where a represents the radius of the cross-section of the half-sphere. Substitution gives $$A = 2\pi(D - \sqrt{D^2 - a^2}).$$

In the y direction, this gives:

$$A = 2\pi D(D - \sqrt{D^2 - 0.75D}) = (2\pi D(D - \sqrt{D^2 - a_y^2}))$$

and in the x direction, $$A = 2\pi D^2 = 2\pi D(D - \sqrt{D^2 - a_x^2}).$$

Solving for $a_y$ and $a_x$ yields the dimensions of the display. Based on these defined and well known relationships and the fact that the display blocks no more than ten to twenty percent of the normal field of view of the wearer, the normal field of view of the viewer also being defined by degrees, the following table governs the range of sizes, in centimeters, of the display for various distances from the user's eye in centimeters. In other words, based on the total field of view calculated for each distance from the user's eye, the range of sizes of the display can be determined by limiting the dimensions to 10-20% of that area. Other distances from the eye are possible under these relationships, but the following table provides various examples of such relationships.

| Distance | Horizontal FOV | Vertical FOV | FOV Area | Min Display Area (cm^2) | Max Display Area (cm^2) |
| --- | --- | --- | --- | --- | --- |
| 1 | 0.5 | 0.43 | 0.22 | 0.02 | 0.04 |
| 2 | 1 | 0.87 | 0.87 | 0.09 | 0.17 |
| 3 | 1.5 | 1.30 | 1.95 | 0.19 | 0.39 |
| 4 | 2 | 1.73 | 3.46 | 0.35 | 0.69 |
| 5 | 2.5 | 2.17 | 5.41 | 0.54 | 1.08 |
| 6 | 3 | 2.60 | 7.79 | 0.78 | 1.56 |
| 7 | 3.5 | 3.03 | 10.61 | 1.06 | 2.12 |
| 8 | 4 | 3.46 | 13.86 | 1.39 | 2.77 |
| 9 | 4.5 | 3.90 | 17.54 | 1.75 | 3.51 |
| 10 | 5 | 4.33 | 21.65 | 2.17 | 4.33 |
| 11 | 5.5 | 4.76 | 26.20 | 2.62 | 5.24 |
| 12 | 6 | 5.20 | 31.18 | 3.12 | 6.24 |
| 13 | 6.5 | 5.63 | 36.59 | 3.66 | 7.32 |
| 14 | 7 | 6.06 | 42.44 | 4.24 | 8.49 |
| 15 | 7.5 | 6.50 | 48.71 | 4.87 | 9.74 |
| 16 | 8 | 6.93 | 55.43 | 5.54 | 11.09 |
| 17 | 8.5 | 7.36 | 62.57 | 6.26 | 12.51 |
| 18 | 9 | 7.79 | 70.15 | 7.01 | 14.03 |
| 19 | 9.5 | 8.23 | 78.16 | 7.82 | 15.63 |
| 20 | 10 | 8.66 | 86.60 | 8.66 | 17.32 |
| 21 | 10.5 | 9.09 | 95.48 | 9.55 | 19.10 |
| 22 | 11 | 9.53 | 104.79 | 10.48 | 20.96 |
| 23 | 11.5 | 9.96 | 114.53 | 11.45 | 22.91 |
| 24 | 12 | 10.39 | 124.71 | 12.47 | 24.94 |
| 25 | 12.5 | 10.83 | 135.32 | 13.53 | 27.06 |
| 26 | 13 | 11.26 | 146.36 | 14.64 | 29.27 |
| 27 | 13.5 | 11.69 | 157.83 | 15.78 | 31.57 |
| 28 | 14 | 12.12 | 169.74 | 16.97 | 33.95 |
| 29 | 14.5 | 12.56 | 182.08 | 18.21 | 36.42 |
| 30 | 15 | 12.99 | 194.86 | 19.49 | 38.97 |

Further, as previously stated above, the Application states that the display component 140 can be a color filter, wide format, active matrix liquid crystal display having a resolution of 854 X 480 and can be 0.54 inches in the diagonal dimension. The Application also previously states that display component 140 can be a color filter, active matrix liquid crystal display having a resolution of 640 X 480 and can be about 0.44 inches in the diagonal dimension and lightweight. If the display component 140 is 854 x 480 with a 0.54 inch diagonal, mathematical relationships reveal that the size of the display is approximately 0.36 inches by 0.64 inches, for a total area of 0.23 square inches. If the display component 140 is 640 X 480 with a 0.44 inch diagonal, mathematical relationships reveal that the size of the display is approximately 0.39 inches by 0.53 inches, for a total area of 0.20 square inches. The application further states that the display component 140 can be a 0.44 inch diagonal SVGA display with about 800 X 600 resolution, a wide SVGA display with about 852 X 600 resolution, an XVGA display with about 1,024 X 768 resolution, an SXGA display with 1,280 X 1,024 resolution or High Definition Television display with either 1,400 X 720 resolution or full 1,920 X 1,080 resolution. Additional dimensions and areas can be calculated based on these ratios and screen diagonals by a person of ordinary skill in the art. This is by permitting operation of one or more additional electronic modules, which may plug into the medallion 905, and then communicate with the monocular device 800 using one or more wireless or wired interfaces such as BLUE-TOOTH®, Wi-Fi, cellular signals, infrared signals, USB, RS-232, RS-485, Ethernet, or another previously described interface that is established between the medallion 905, and the monocular device 800. It is envisioned that the medallion 905 may be operatively coupled to the display 810 to provide power to the display 810.

Figure 14:
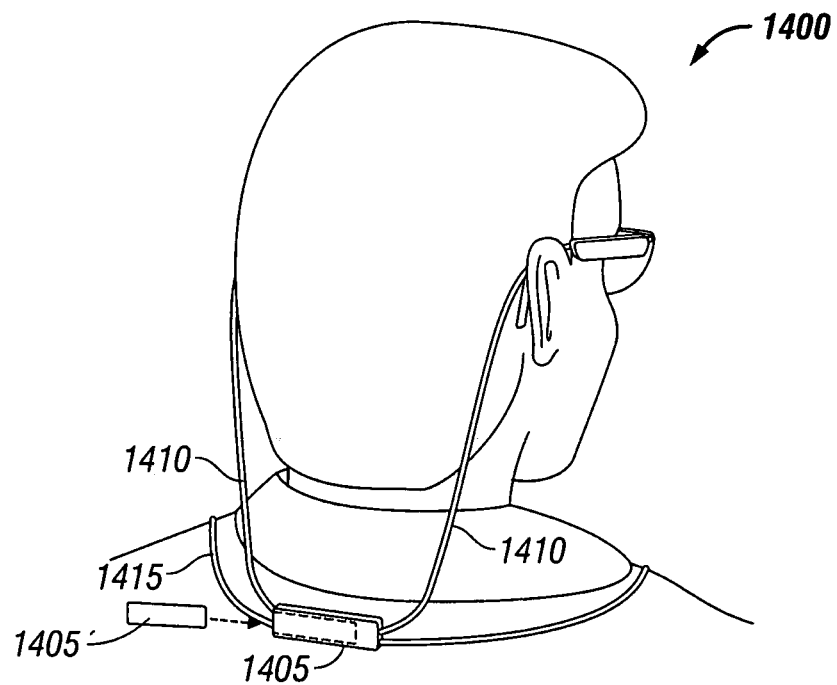

In one embodiment, the monocular device 800 may communicate wirelessly with the medallion 905 using a wireless protocol. In another embodiment, the monocular display device 800 may communicate with the medallion 905 using a wired connection or interface. In yet another embodiment, the medallion 905 may communicate with the lanyard interface 1410 in a wired or wireless manner and the lanyard interface 1410 may then communicate with the monocular display device 1400 in a wired or wireless manner (FIG. 14). Various connection configurations are possible and within the scope of the present disclosure, and it is envisioned that each of the components (medallion 905, device 800, lanyard 930) preferably may communicate with one another using radiofrequency energy.

As can be seen, the medallion 905 may further include a first USB interface slot 920 and a second USB interface slot 925 in different locations of the medallion 905. Other components may be inserted into the slots 920, 925 in order to expand the capabilities of the medallion 905 such as expanding the memory capabilities, video, audio, or sensory functions, or graphical capabilities of the medallion 905, or monocular display device 800.

Figure 10:
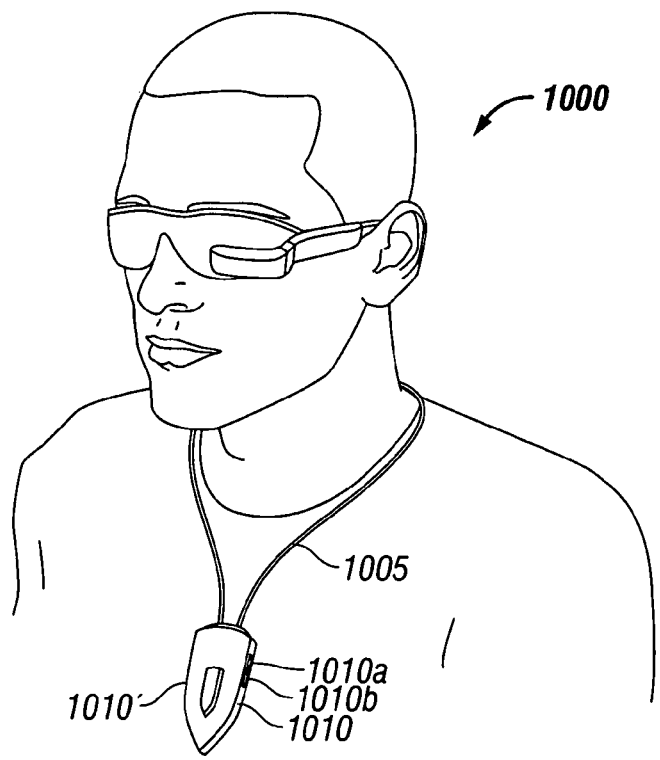
FIG. 10 shows a user viewing images with the monocular display device and the user wearing another embodiment of a multifunctional medallion.

Turning now to FIG. 10, there is shown a perspective view of a user wearing the monocular display device 1000 with the device being connected to a pair of sunglass frames F. Here, the device 1000 includes a lanyard interface 1005 connected to the frames F and a medallion 1010 connected to the lanyard interface 1005. In this embodiment, the medallion 1010 includes a different non-oblong shaped configuration and instead is generally triangular shaped and includes a cover 1010' with a first and second input buttons 1010a, 1010b positioned on the lateral side of the medallion 1010.

Figure 11:
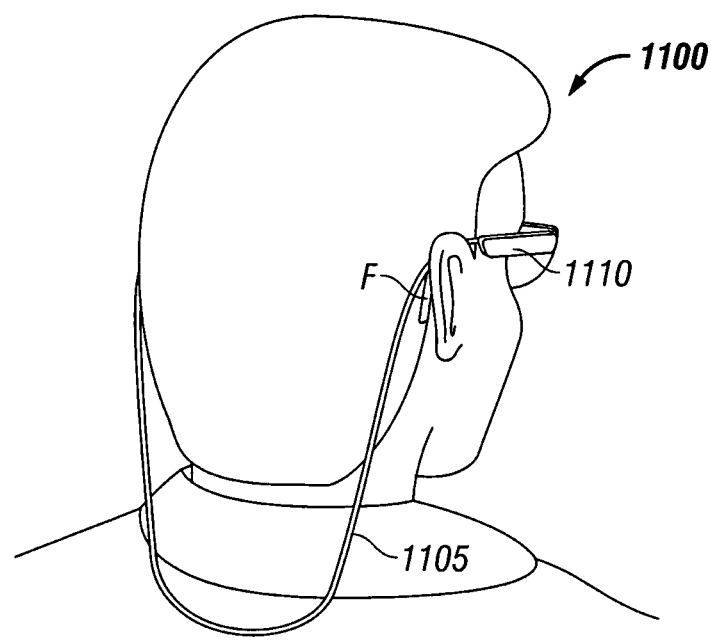
FIG. 11 shows a rear of the user wearing a lanyard interface that is connected to the monocular display device with the lanyard interface providing increased functionality to the monocular display device.

Turning now to FIG. 11, there is shown a rear view of a user wearing a monocular device 1100 according to the present invention. The monocular device 1100 includes a lanyard interface 1105 and a wired auxiliary battery 1110 removably connected to an eyeglass frame F. As discussed previously, the wired auxiliary battery 1110 may be wired through the lanyard interface 1105 to the monocular display device 1100 or may be stowed in a non-wired manner, and then connected when needed. In another embodiment, the wired auxiliary battery 1110 may include an engagement structure (a clip or fastener) to be hooked to the wearer's garment or eyeglasses. It should be appreciated that the device 1100 may include several different batteries that may be replaceable for extended use.

Figure 12:
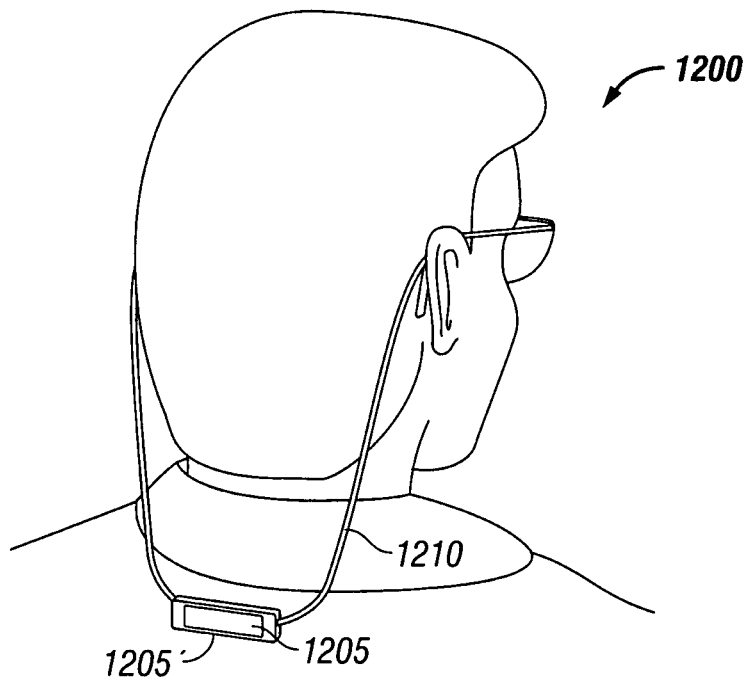
FIG. 12 shows another rear view of the user wearing a lanyard interface that is connected with the monocular display device with the lanyard interface providing increased battery life.

Turning now to FIG. 12, there is shown a rear view of a user wearing another monocular device 1200 having an auxiliary power supply 1205. In this embodiment, the monocular device 1200 includes a lanyard interface 1210, and a wired auxiliary battery 1205. Battery 1205 is connected to the lanyard interface 1210 at about a midpoint of the lanyard interface 1210 in the rear of the user. As discussed previously, the wired auxiliary battery 1205 may be wired through the lanyard interface 1210 to the monocular display device 1200 and connected only when needed, or connected when a primary battery power supply (not shown) has been exhausted.

The wearer, using the monocular display device 1200 and an input/output device, may control switching from the primary battery to the auxiliary battery 1205 using a control signal output from the monocular display device 1200. This is accomplished without removing the monocular device 1200 from the wearer's head. In this embodiment, the wired auxiliary battery 1205 disposed on the lanyard interface 1210 may include a cushioned housing 1205' and an engagement structure having a clip or fastener. The battery 1205 may be hooked around, to, or through the lanyard interface 1210. The wearer may include several different lanyard interface components 1210 with fresh batteries that may be replaced once the lanyard interface 1210 having the auxiliary battery 1205 is exhausted. Battery 1205 may also be configured as a primary battery to power the monocular display device 1200.

Figure 13:
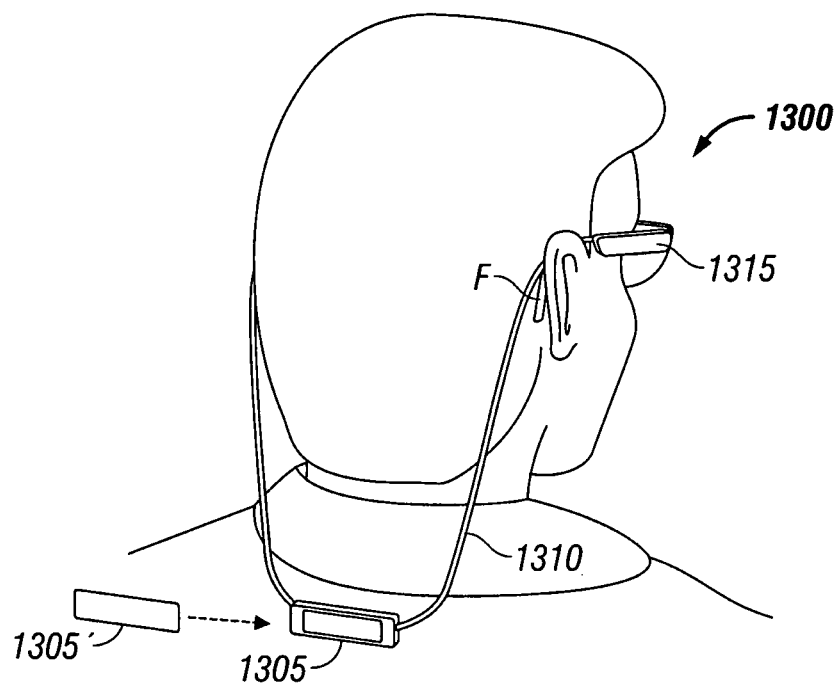
FIGS. 13 through 15 show several rear views of the user wearing other embodiments of the lanyard interface operatively connected to the monocular display device.

Turning now to FIG. 13, there is shown another rear view of a user wearing another monocular device 1300 according to the present invention. The device 1300 has auxiliary or secondary components 1305' connected to a lanyard interface 1310 that may be replaceable/interchangeable. In this aspect, not only the power supply may be replaced, but also other components may be removably connected to the device 1300 using a USB port or other connection. In this embodiment, the monocular device 1300 includes a lanyard interface 1310 with other functional electronic components exclusive of a wired auxiliary battery. These secondary components may include media drives, video components, audio components, solid-state devices, music players, graphical components, antennas, transmitters, receivers, Global Positioning Systems, mobile devices, mobile phones, Personal Digital Assistants, scanners, or other plug and play components. These components or electronics generally shown as reference numeral 1305' may be connected to the lanyard interface 1310 at substantially a midpoint of the lanyard 1310 in the rear of the user, or alternatively in other locations. These secondary components or electronics generally shown as reference numeral 1305' may alternatively be connected to an auxiliary housing 1315 that is connected to a frame F on the opposite side of the wearer (relative to the display) instead of being located in the rear of the user as shown.

The components, may be wired through the lanyard interface 1310, to be coupled to a circuit or board associated with and coupled to the monocular display device 1300. Components 1305' can be connected only when needed, or alternatively may remain connected throughout the operation of the device 1300. The wearer using the monocular display device 1300 and using an input/output device may control operation of the components 1305' without having to toggle any buttons associated with the components 1305' themselves or use any other separate controllers or control signals associated with the components 1305'. The wearer may control these components 1305' with ease using solely the monocular display device 1300 and without removing the monocular display device 1300 for convenient operation in a networked arrangement.

Similarly, the components 1305', connected to lanyard interface 1310, may include a cushioned housing and an engagement structure having a clip or fastener to connect to the lanyard interface 1310. It should be appreciated that the wearer may include several different lanyard interfaces 1310 in sets or groups and each with different components 1305' that may be replaced and interchanged. For example, the user may have a first lanyard interface 1310 with a rear view camera that may be controlled by the monocular display device 1300 for taking images.

In another example, the user may have a second lanyard interface 1310 (not shown) with different component such as a Global Positioning System that can also be controlled by the monocular display device 1300 using a common communication protocol, or networked relationship.

In another example, the user may have a third lanyard interface (not shown) with another two or more different components such as a music player and a mobile communication device. Both can be controlled by the monocular display device 1300 using a common communication protocol, or networked relationship. In this manner, the user may select which components the user is going to use over the course of a period of usage and then select the appropriate lanyard interface 1310 with components 1305'. The user may also include lanyard interfaces 1310 with no components, but instead these lanyard interfaces 1310 may act as a housing and be selectively loaded with other components 1305' as needed. Various lanyard configurations 1310 are possible and within the scope of the present disclosure.

Turning now to FIG. 14, there is shown yet another rear view of a user wearing another monocular device 1400 according to the present invention having replaceable and upgradeable components 1405' being connected to a plug 1405 of the lanyard interface 1410. In this embodiment, the monocular display device 1400 includes a lanyard interface 1410 with other functional electronic components 1405'. As mentioned above, these components 1405' may include media drives, video components, audio components, solid-state devices, music players, graphical components, antennas, transmitters, receivers, Global Positioning System components, sensors, mobile device components, mobile phone components, Personal Digital Assistant components, scanners, plug and play components, or speakers. These components or electronics 1405' may be connected to the lanyard interface 1410 at plug 1405 at substantially a midpoint of the lanyard interface 1410 in the rear of the user to evenly distribute the device's weight.

Additionally, other component modules (not shown) may also be connected to the medallion (not shown) along connection 1415. In this manner, at least one of (or both) the monocular device 1400 and medallion (not shown) may control the component 1405' disposed in the lanyard interface 1410.

Figure 15:
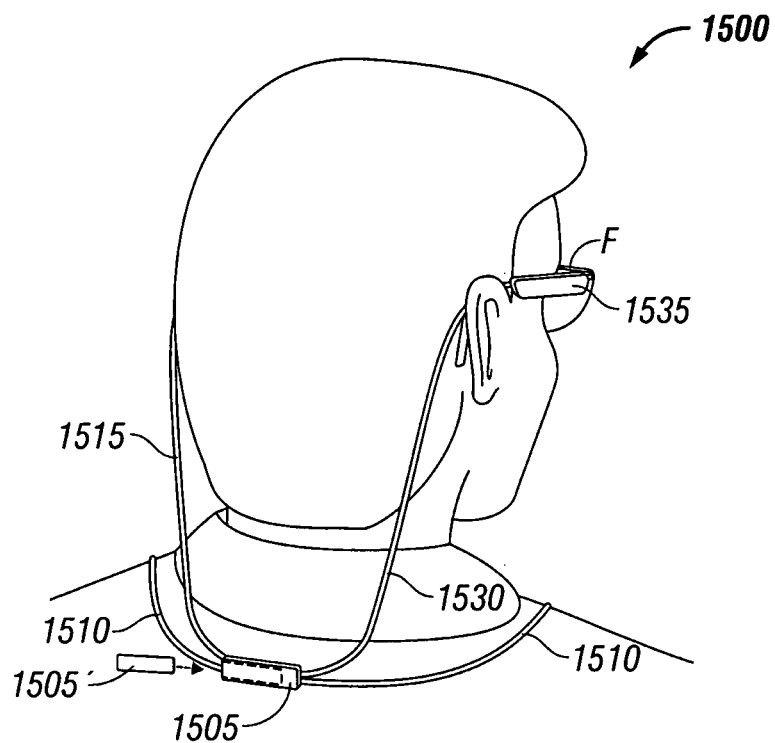

In one embodiment shown in FIG. 15, the medallion (not shown) and the component 1505 connected to the lanyard interface 1530 may be both tethered along a single wire 1510 as shown in FIG. 15 for wired communication and so as to remove and upgrade the lanyard interface 1530. In the embodiment of the monocular display device 1500 of FIG. 15, the monocular display device 1500 may include dual replaceable connections so the lanyard can be removed in sections.

A first connection 1515 from between (i) the lanyard interface and the monocular device 1500 is removable, and (ii) another connection between line 1530 from the lanyard interface to the secondary housing 1535 connected to the frames F is also removable.

In this aspect, both (i) sections of the lanyard interface 1510 and (ii) the secondary housing 1535 may each be detached from one another or from the monocular display device 1500 for replacement with another fresh or different component. Likewise, sections 1510 operatively coupled to the medallion (not shown) are also removable.

Figure 16:
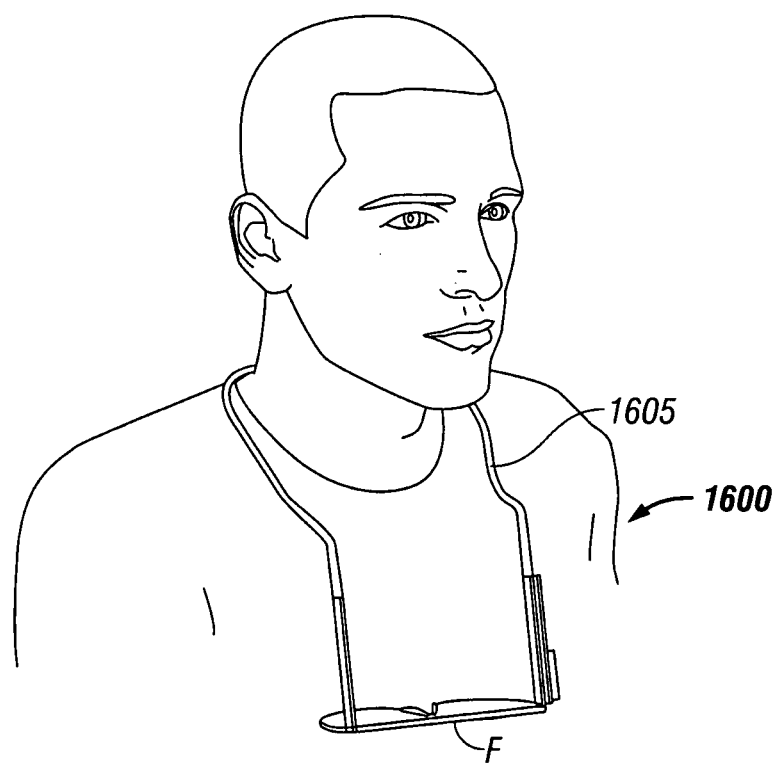
FIGS. 16 through 18 show several front views of the wearer having the monocular display device around the wearer's neck and supported by the lanyard interface.
Figure 17:
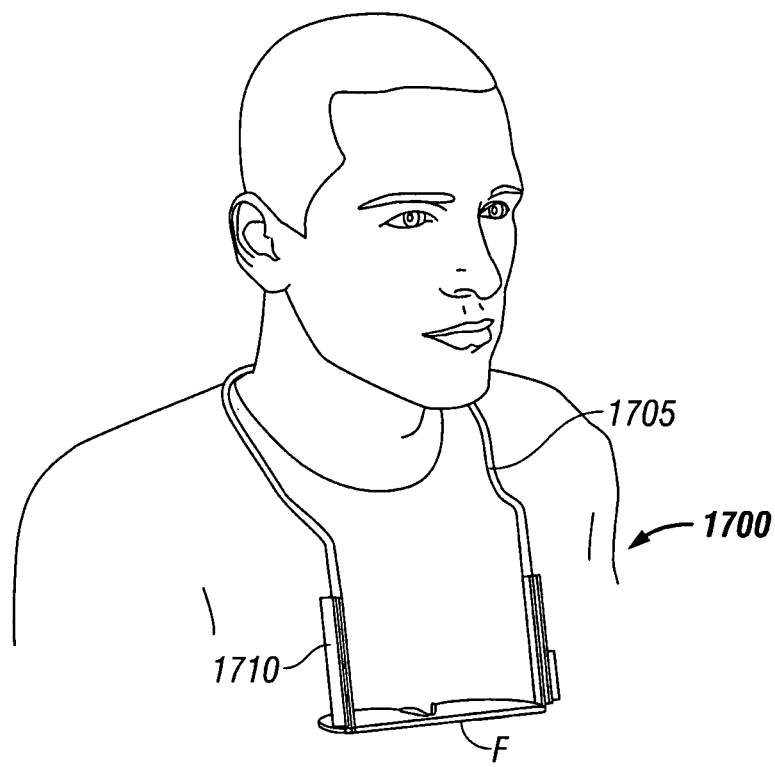

Turning now to FIG. 16, there is shown a monocular device 1600 connected to lanyard interface 1605 with the monocular device 1600 resting around the neck of the wearer in a stowed position. It should be appreciated that the monocular device 1600 does not detach readily from the lanyard interface 1605. This secure connection prevents the device 1600 from falling and avoids damaging the device 1600. In the embodiment of FIG. 17, the monocular display device 1700 may further include the secondary auxiliary housing 1710 disposed on an opposite side of the eyeglass frame F that also does not detach when in the lowered position.

Figure 18:
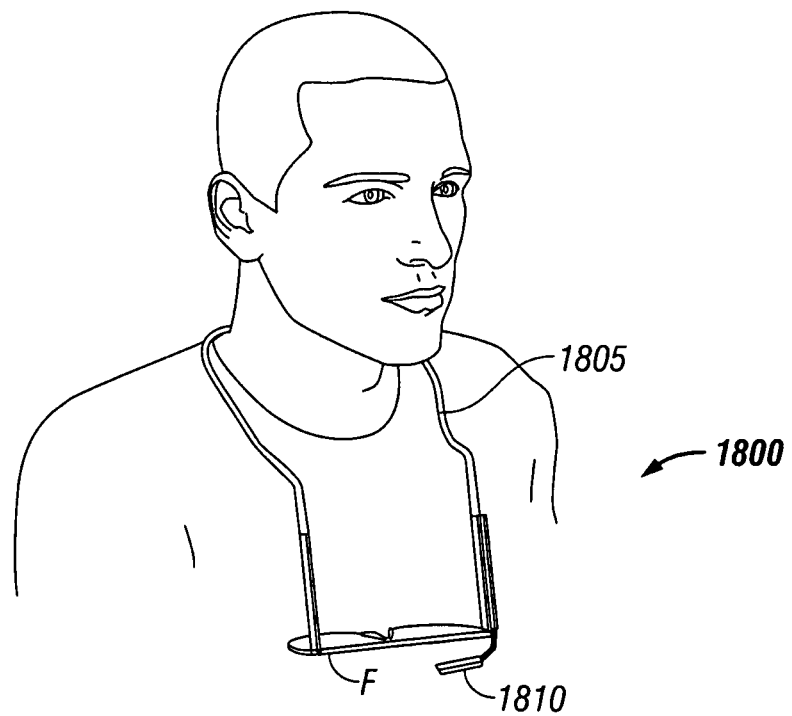

Turning now to FIG. 18, the lanyard interface 1805 may be connected directly to the frame F, or may alternatively be attached to the monocular display device 1800 as shown. In FIG. 18, the display housing 1810 is shown in the extended or viewing position and does not move readily unless pulled by the display housing 1810.

Figure 19:
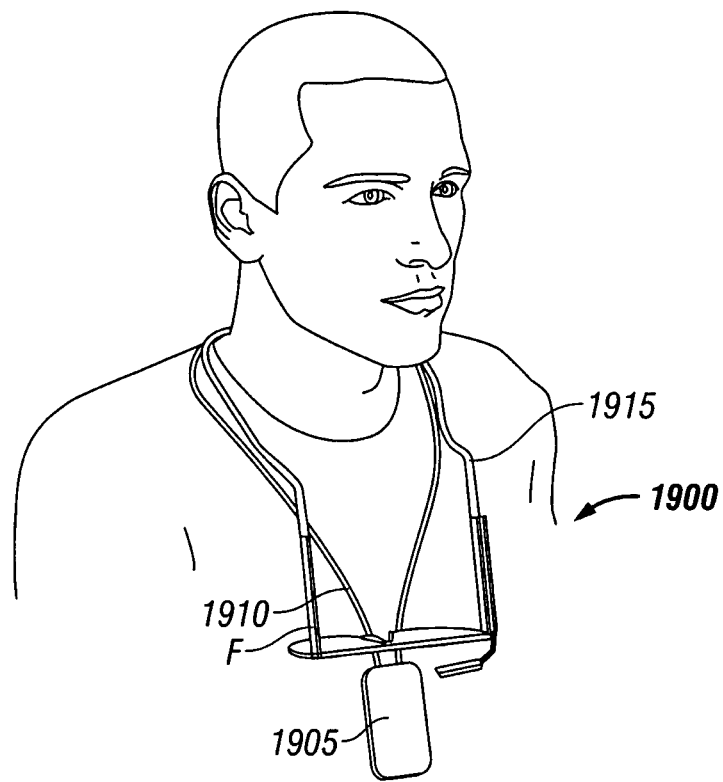
FIG. 19 shows another view of the monocular display device having a medallion and a wired lanyard interface worn around the neck of a wearer.

Turning now to FIG. 19, there is shown a monocular display device 1900 worn around the neck of a wearer. In this embodiment, the monocular display device 1900 includes a medallion 1905 connected to a band 1910. Preferably, the band 1910 encircles the wearer's neck and supports the medallion 1905 and the user wears a lanyard interface 1915 in order to support the monocular display device 1900. In this embodiment, the medallion 1905 provides multi-functional capabilities as discussed previously including primary or secondary electronics components such as, for example, sensors, Global Positioning Systems, television video cards, memory, satellite radio devices, or additional batteries for operation of the monocular display device 1900.

In this embodiment, the lanyard interface 1915 may be operable to connect to the user's eyeglass frame F, but also be operable to communicate with the medallion 1905 and provide a wired or wireless connection between the medallion 1905 and the monocular display device 1900.

Figure 20A:
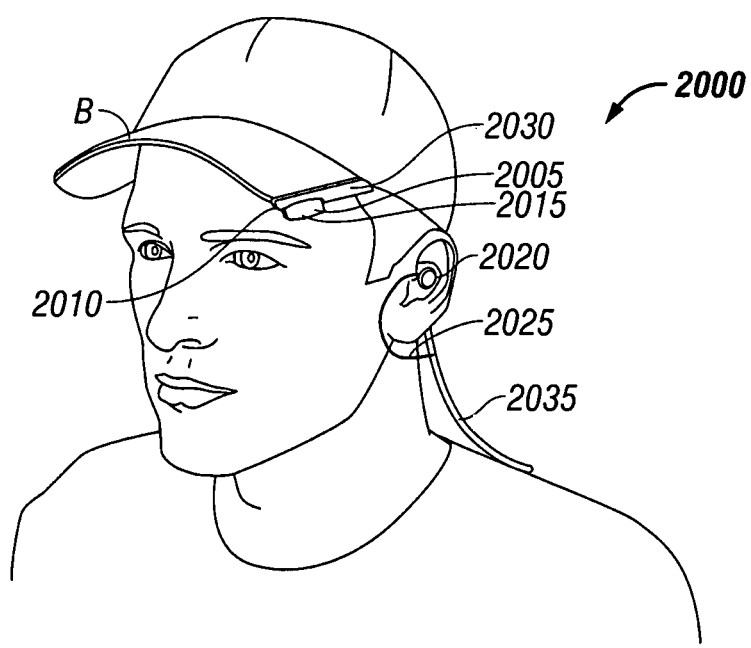
FIG. 20A shows a monocular display device that is supported on a baseball cap brim.

Turning now to FIG. 20A, there is shown a further embodiment of the present disclosure of the monocular device 2000. In this embodiment, the monocular device 2000 is not intended to be connected to an eyeglass frame F, but instead may be connected to a brim of a baseball cap B. In this embodiment, the monocular display device 2000 includes a display 2005 supported on a housing 2015 that is connected by an arm 2010. The housing 2015 is generally a rectangular shaped member that includes an engagement structure for removably connecting with a brim B of the baseball cap, hat, or other garment.

In another embodiment, the engagement structure may connect with other portions of the baseball cap instead of the brim B, however, preferably the display housing 2015 permits the display 2005 to be positioned in a location where the display does not substantially occlude the viewer's vision, and the viewer may view ninety to ninety five percent of the viewer's normal viewing area (relative to the instance if the display 2005 was not present in the viewer's field of vision). The display 2005 is shown disposed in the stowed position, or more particularly is positioned in alignment with the brim B. The monocular display device 2500 further includes a speaker system 2020 for audio. An ear bud 2020 or speakers are disposed in or on the monocular display device 2000. The ear bud 2020 is connected along wire or lead 2025. Wire 2025 is connected to a lanyard interface 2035, which is connected to a body portion 2030 of the monocular display device 2000, so the monocular display device 2000 can output an audio signal to the ear bud 2020 through the wired lanyard interface 2035.

Further, the monocular display device 2000 of the FIG. 20A embodiment includes a connection to the lanyard interface 2035. As mentioned, the lanyard interface 2035 may have additional components to provide additional functionality to the monocular display device 2000.

Figure 20B:
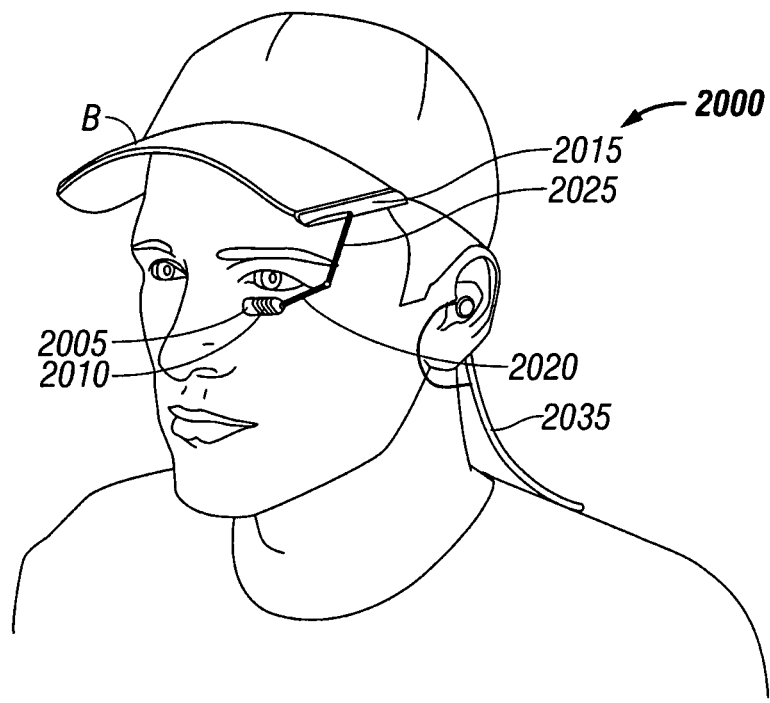
FIGS. 20B and 20C show front views of the monocular display device with a display supported on one side of the brim and an auxiliary housing supported on an opposite side of the brim to provide increased functionality.

Turning now to FIG. 20BA, the monocular device 2000 is shown in a viewing position. Here, the display 2005 is supported in a display housing 2010 and is located extended from a body portion 2015. In the viewing position, the display 2005 is located in the peripheral vision of the viewer with first and second arms 2020, 2025 extended from the body portion 2015. The display housing 2010 may be connected to the body portion 2015 by an articulating and telescoping arrangement as discussed above with the previously described embodiments.

Figure 20C:
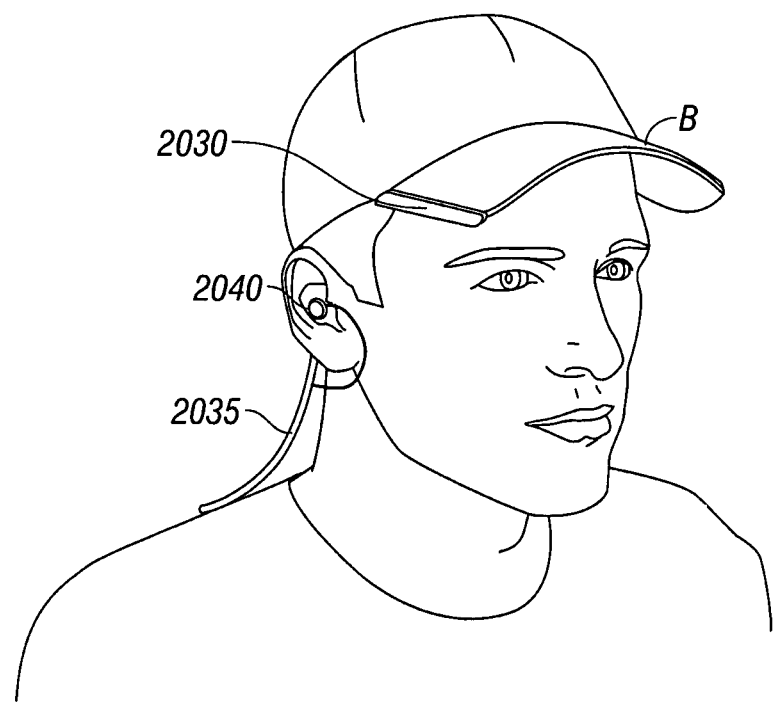

Turning now to FIG. 20C, the monocular display device 2000 may further comprise an auxiliary body portion 2030 that connects with the brim B. Auxiliary body portion 2030 has an engagement structure that permits the auxiliary body portion 2030 to be selectively retained on a baseball cap brim B. The auxiliary body portion 2030 may include a clip or similar member to fasten with, or removably connect along, the lateral edge of the brim B as shown. The auxiliary body portion 2030 may further be connected to a wired lanyard interface 2035 by a port, or by a wireless interface. As mentioned, the auxiliary body portion 2030 may provide increased functionality to the monocular display device 2000 by storing additional electronic components on a brim B of the baseball cap B while at the same time being very lightweight and compact. In one embodiment, the auxiliary body portion 2030 may further include a speaker 2040 or ear bud that connects with a jack or output port (not shown) of the monocular display device 2000 through the wired lanyard interface 2035. Other previously described secondary components may be connected in the portion 2030 to expand the functionality of the device 2000.

Figure 21A:
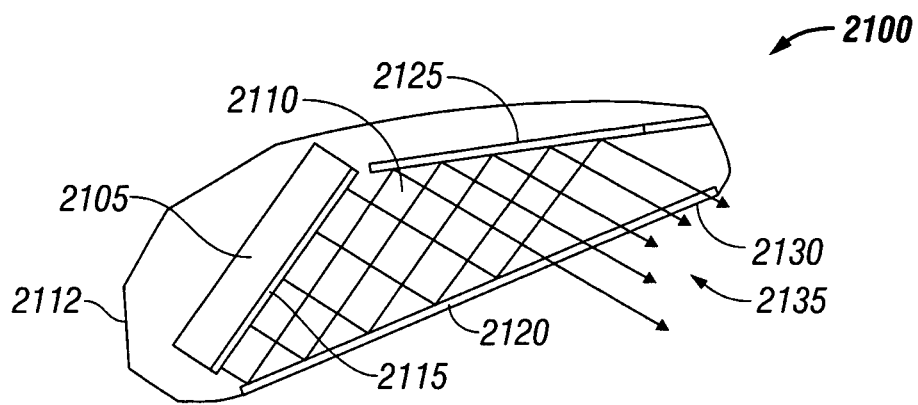
FIGS. 21A, 21B, 21C and 21D show a display component configuration for the monocular display device and an adjustment configuration according to the present invention.
Figure 21B:
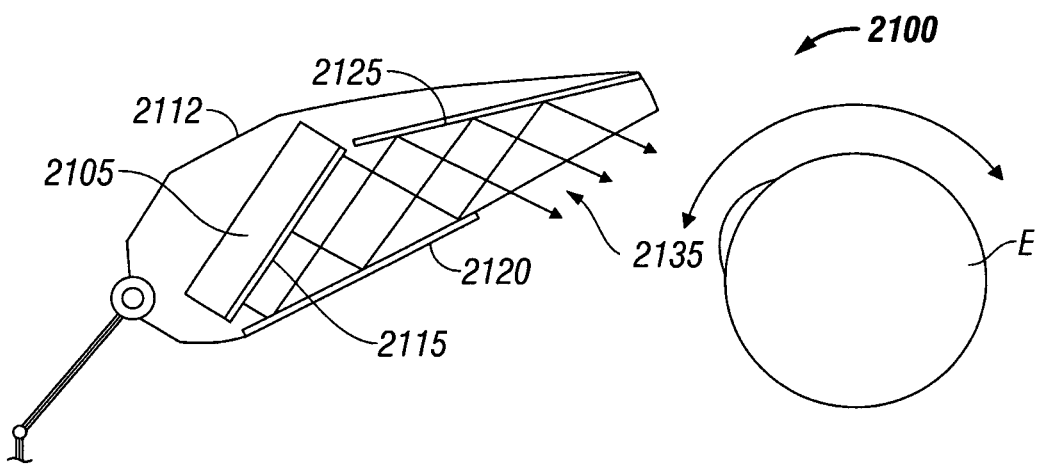

Turning now to FIGS. 21A and 21B, there is shown two views of an embodiment of the display 2100 for the monocular display device 2000. As mentioned, the display 2100 is configured to be lightweight and portable, with a diagonal dimension less than one inch. The display 2100 is also configured to have a maximum weight ranging from merely one pound to several ounces, or less. The display 2100 also provides for sufficient picture clarity and display resolution. The display 2100 permits the monocular display device to display command prompts relating to an operating system such as MICROSOFT WINDOWS MOBILE®, the PALM® operating system, the LINUX® operating System, MICROSOFT WINDOWS VISTA®, the SYMBIAN® operating system, or another operating system. Alternatively, the display 2100 may be operable with remote computing device to only display graphics and multimedia to the wearer in a digital format, while other functions are performed remotely.

FIG. 21A shows one embodiment where the display 2100 is a prismatic optical display, or a display having prismatic projections. In this embodiment, the display 2100 may include a display component 2105 that is mounted to a display housing 2112 (FIG. 21B). The display component 2105 may be any micro-display component, a self luminous display component, an organic light emitting display component, a cholesteric display component, an electroluminescent display component, an electrophoretic component, an active matrix liquid crystal display component, a liquid crystal display component, or a lightweight display component using light emitting diodes.

It should be appreciated that the display component 2105 should have sufficient brightness and clarity, but at the same time operate within predefined low power limits and also be lightweight.

The display 2100 further includes a prismatic optical configuration including several optical surfaces arranged to direct the enhanced virtual image to the user in a magnified manner. The prismatic optical configuration includes a first aspherical optical surface or element 2115 and first and second reflective surfaces 2120, 2125. The first aspherical optical surface 2115 initially receives the image from the display component 2105.

The image is then reflected from the first and the second reflective surfaces 2120, 2125 to properly orient the image that is emitted from the display component 2105 to the viewer. In one embodiment, the first and the second reflective surfaces 2120, 2125 are plain reflective surfaces. In another embodiment, first and second reflective surfaces 2120, 2125 may be diffractive, and or micro-lens reflective surfaces, or mixed with the first surface 2120 being a diffractive and or micro-lens reflective optical surface while the surface 2125 is a plain reflective surface. In this embodiment, the display 2100 may further include a second aspherical optical and or micro-lens surface 2130 with the second aspherical optical surface 2130 being positioned relative to an outlet 2135. Alternatively, another different optical element may be positioned at the outlet 2135.

The first and the second aspherical optical surfaces 2115, 2130 are adapted to properly orient the image at the outlet 2135. In this manner, the image will be emitted from the display component 2105 to the first aspherical optic surface 2115 and to the first reflective surface 2120. The image will then be properly oriented to the second reflective surface 2125 and displayed in a virtual optically magnified manner to the viewer through outlet 2135 as shown in FIG. 21B.

In one embodiment, the monocular display device 2100 can have a display 2105 with optical elements having at least four optical surfaces. These surfaces include an aspherical entrance surface 2115 for receiving the image from the display 2105, an aspherical exit surface 2130 so the user views the image directly through the exit surface 2130 and at least two reflective surfaces 2120, 2125. Each reflective surface 2120, 2125 can be positioned to reflect the displayed image from the entrance surface 2115 to the exit surface 2130. The four or more optical surfaces of the optical element 2115, 2120, 2125, 2135 can be shaped or molded to generate a magnified virtual image of displayed image. This permits the user to view crisp and clear images close to the user's eye E.

The virtual image appears to be located a distance from the user. This image is substantially greater in size relative to an optical path defined from a path measured from the display 2105 through the optical element 2115 and to the user's dominant eye E (FIG. 21B).

Figure 21C:
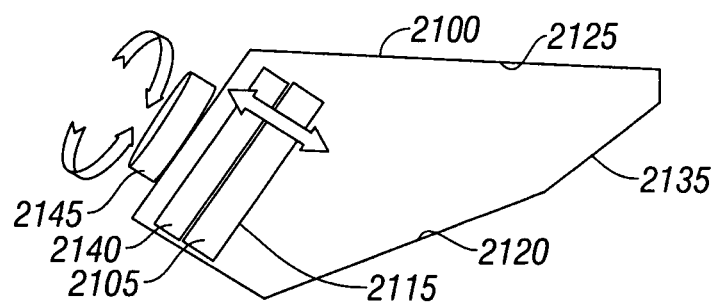

Turning now to FIG. 21C, in one embodiment, the optical surface or element 2105 of the display 2100 can be connected to a mounting bracket 2140 with a user operated focus adjustment. The display 2105 can be moved along a generally linear axis to vary the distance between the optic element entry surface 2115 and the display 2105. This linear movement allows for an independent user image focus adjustment.

The optical element 2115 is substantially free from distortion, astigmatism, chromatic aberrations and is designed for displaying low to high resolution text, charts, graphs, photographs, maps, graphical user interfaces, Internet web pages and video content with overall quality.

The display 2100 can be configured to include at least one monocular optical element surface 2115 including an entrance surface, multiple reflecting surfaces 2120, 2125 and an exit surface 2135. These surfaces can be curved to contribute to display image magnification producing the virtual image. In another alternative embodiment, the display 2100 can be configured with at least one optical element reflective surface being flat and the exit surface 2135 being aspherical. A distance between the optical element surface and the display 2105 can also be user adjustable. In one embodiment, the distance can be manually adjustable with a knob 2145 (FIG.

Figure 21D:
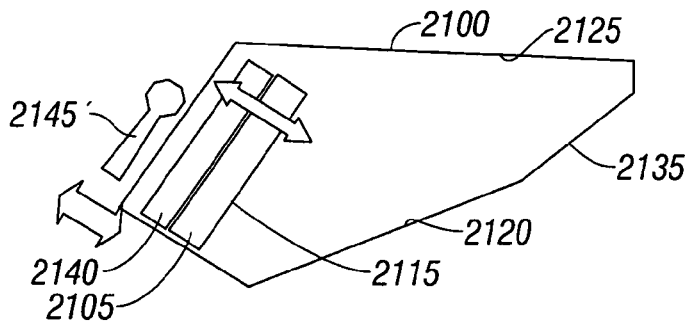
Figure 22A:
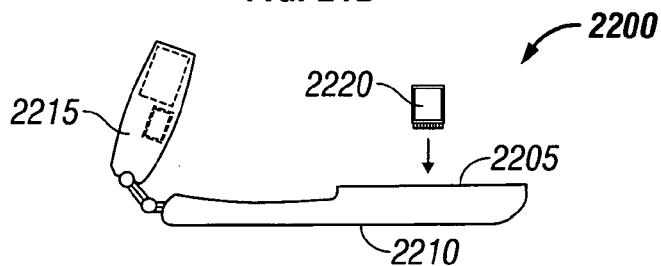
FIGS. 22A through 22D show another embodiment of the monocular display device with a component slot on the body portion of the device.
Figure 22B:
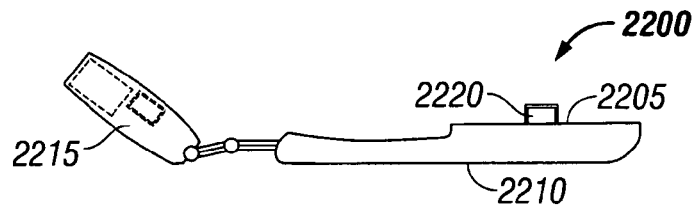
Figure 22C:
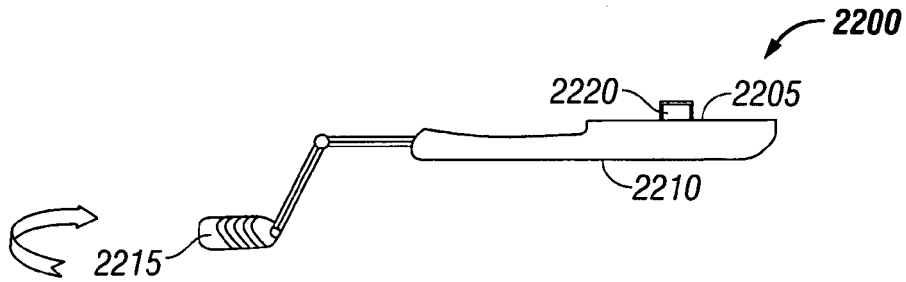
Figure 22D:
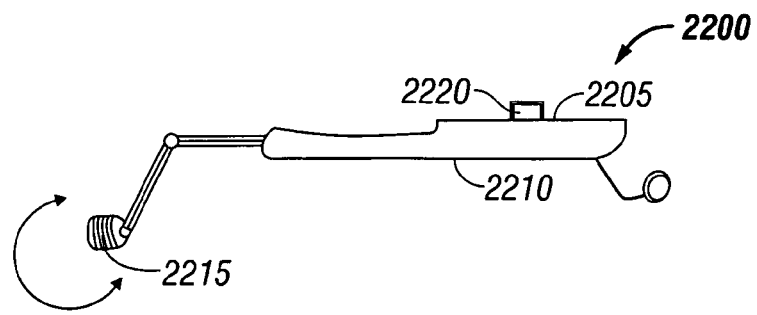

21C), a lever 2145 (FIG. 21D), a wheel, or a button. Various adjustment and actuator configurations are possible and within the scope of the present disclosure. This can either increase or decrease the distance between the optical element entrance surface 2115 and the display 2105. This allows the user to adjust the virtual image focus to the user's eye, and for the image to appear clear and magnified to the user in a location that is near the user's dominant eye E (FIG. 21B).

The display 2100 may be formed from a single block of optical material with at least four surfaces with at least two side surfaces being reflective surfaces. Each surface may include a plurality of apertures aligned in a row extending generally parallel to the optical element exit surface. Each aperture on one side surface has a complimentary aperture on the other side surface forming a pair.

Alternatively, the optical element 2100 can be a solid element formed of at least two different materials to form an achromat. The optical element 2100 may include at least one entrance surface 2115 and one exit surface 2130 that are formed of a first material that is different than a second material from which the reflective surfaces 2120, 2125 are formed. The optical element 2100 can be formed by bonding together at least two different optical materials to form a solid optical element, or panel. The display 2100 may incorporate or a clear, flat, transparent, protective, scratch resistant film or other element to protect the optical element exit surface 2135 (FIG. 21C) from collecting dirt, scratches, cleaning or damage.

Turning now again to FIG. 21B, the display component 2105 of FIG. 21A is disposed in the display housing 2100 in a manner so that the housing 2100 remains compact and thin. As shown, the displayed image is positioned so as to be in the peripheral vision of the viewer's dominant eye D and so as to permit the user to have ninety to ninety five percent of the vision unobstructed or non-occluded, while at the same time emitting high resolution, bright, optically enhanced, virtual images in the viewer's peripheral vision. At the same time, the user can have the housing 2100 sufficiently close to the eye so the images appear magnified. As shown in FIG. 21B, the monocular display system 2100 may include a reflective surface 2120 that provides for image error correction. Likewise, the reflective surface 2125 may be made in a similar manner that also provides for optical image error correction with diffractive surface elements and or micro-lens surface optical elements being disposed between the reflective surfaces 2120, 2125.

Turning now to FIG. 22A through 22D, there is shown another embodiment of a monocular device 2200 including a component slot 2205. In this embodiment, the component slot 2205 is located in a body portion 2210 of the device 2200; however, the component slot 2205 may be located in other areas such as, for example, in a display 2215. As mentioned above, the component slot 2205 can be configured to receive a previously described component 2220 that is lightweight and that adds functionality to the device 2200. In one embodiment, the component 2220 may be a mini-card, a memory, a GPS device, a Universal Serial Bus ("USB") component, a broadcast TV tuner and or broadcast radio tuner, or similar device that plugs into a component slot 2205. Various lightweight functional component configurations are possible and within the scope of the present disclosure.

Figure 23A:
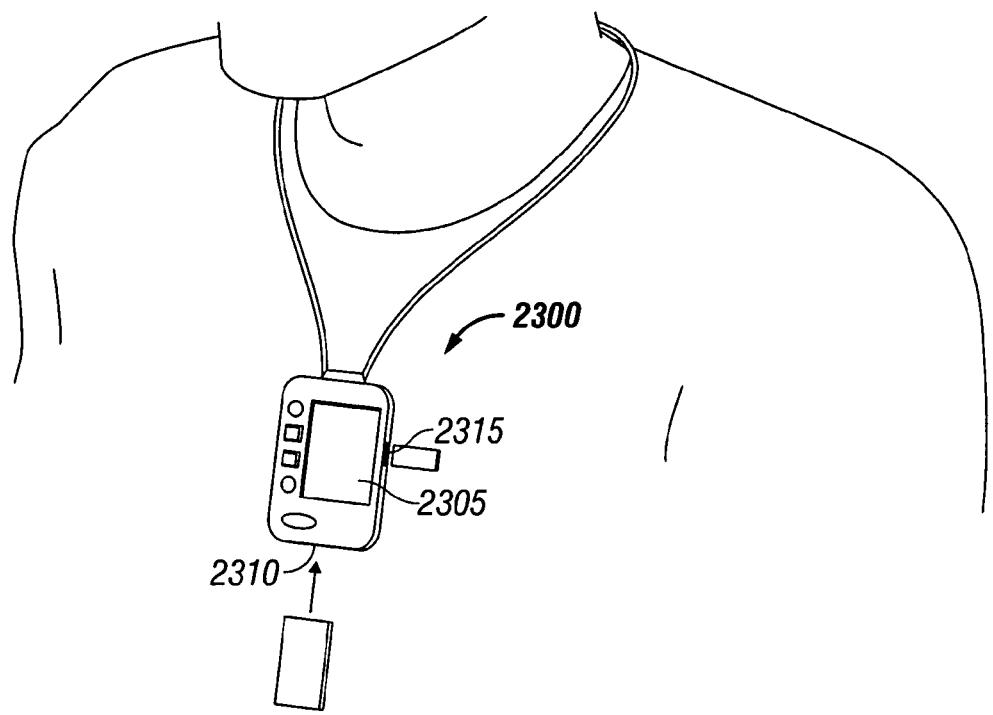
FIG. 23A shows a medallion including a touch screen display.

Turning now to FIG. 23A, there is shown a medallion 2300 similar to the previously described embodiments. The medallion 2300, in this embodiment, may further include a wireless touch screen device 2305 which may be used to control the display (not shown) and the medallion 2300 can be the input/output device.

Figure 23B:
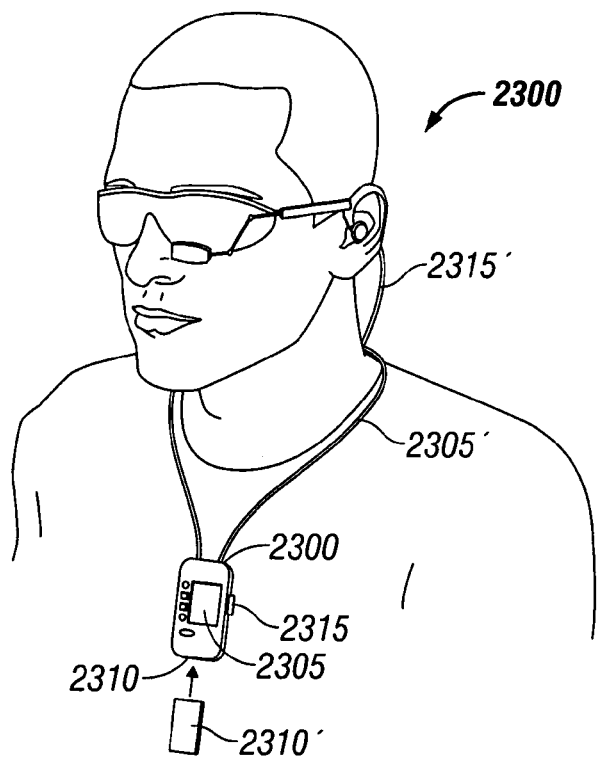
FIG. 23B shows the medallion including the touch screen configured to wirelessly control operation of the monocular display device.

The touch screen 2305 may be located in a position which is adjacent to slots 2310, 2315 and can receive an input signal by the user dragging the user's finger across or over an overlay on the touch screen 2305. In this manner, as shown in FIG. 23B, the touch screen 2305 on the medallion 2300 is supported using neck or wrist band 2305' and, may wirelessly output radiofrequency input signals to assist with controlling the monocular display 2300, which is connected to the lanyard interface 2315'. In this manner, the wearer can control the device 2300 and/or external devices using the medallion touch screen 2305. Various input control configurations are possible and within the scope of the present disclosure.

Figure 24:
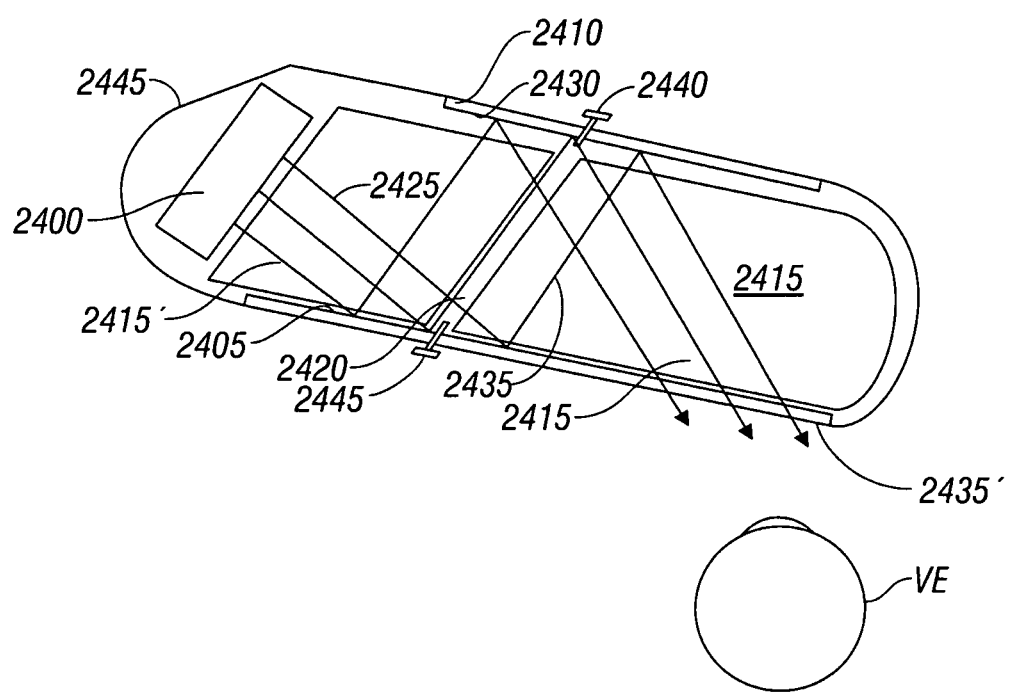
FIG. 24 shows another embodiment of a prismatic optical element including a field lens and an objective lens for connecting to a display.

Turning now to FIG. 24, there is shown an alternative configuration for the display element 2400, and for magnifying the overall image that is displayed to the viewer. This configuration provides for a magnified image while the display element 2400 remains in a lightweight, compact, thin, and low cost configuration. In this embodiment, the display element 2400 is one of the display elements previously described, and emits an image, such as, for example, an organic light emitting diode display, or other display element. The image is preferably reflected against two mirrored surfaces, or a first mirrored surface 2405 and a second mirrored surface 2410.

Preferably, the display element 2400 is located adjacent to a first field lens 2415 and a second objective lens 2415'. The field lens 2415 is connected to the second objective lens 2415' and includes an air gap 2420 disposed therebetween. The field lens 2415' preferably collimates the illumination of display element 2400 and matches the illumination with the objective lens 2415 across the air gap 2420.

In this aspect, the image is magnified in a prismatic manner across at least four optical surfaces to magnify the image displayed to the viewer. FIG. 24 shows that the image is initially emitted from the display element 2400. The image passes through a first optical surface and then passes through the field lens 2415' to the first mirrored surface 2405, which is configured to redirect the image about ninety degrees in a direction toward the viewer. Thereafter, the image is reflected to the second optical surface 2430 and across the air gap 2420 to the third optical surface 2435 and to the objective lens 2415.

The image then passes from the second mirrored surface 2410, where the image is reflected about ninety degrees to the fourth optical surface 2535'. The image then is magnified and properly displayed to the viewer's eye VE. For ease of assembly, the field lens 2415' is assembled with, or otherwise connected to, the objective lens 2415 with a predetermined air gap 2420 using a first and a second registration pins 2440, 2445. Pins 2440, 2445 are dimensioned to properly fix the distance between the lenses 2415', 2415 during assembly. Registration pins 2440, 2445 preferably have a predetermined length and are dimensioned so the optical distance is preserved between the field lens 2415' and the objective lens 2415, and to properly magnify and display the image to the user. The registration pins 2440, 2445 are preferably molded for ease of assembly into the lenses 2415', and 2415. The lenses 2415', and 2415 are preferably enclosed in a suitable housing 2445 that is thin, and low cost. Alternatively, the display 2400 may be connected to a lens as described in U.S. patent application Ser. No. 11/420,624 to Ray Hebert entitled "Devices, and Methods for Image Viewing", which is herein incorporated by reference in its entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A headset computing device comprising:
   a housing;
   a display connected to the housing and configured to project a virtual image and arranged relative to a wearer's eye when the device is mounted on the wearer's head, wherein the same wearer's eye has a total field of view being defined as at most 180 degrees in a horizontal, and at most 120 degrees in a vertical direction; the virtual image projected from the display onto a portion of a surface of an eyeglass optical element external to the housing, the displayed virtual image permitting the wearer to see about ninety to ninety-five percent of the wearer's normal vision through the eyeglass optical element; and
   a support member comprising an eyeglass frame with ear support, the support member being connected to the housing and the display that supports the display relative to the same wearer's eye, the display being located in a position relative to the same wearer's eye so the display is located in a peripheral view of the total field of view of the same wearer's eye while the display is operatively projecting virtual images.

2. The headset computing device of claim 1, wherein the display is spaced from the wearer's dominant eye and positioned a predetermined amount spaced horizontally from the wearer's eye, and a predetermined amount spaced vertically from the wearer's eye.

3. The headset computing device of claim 1, wherein the display is generally disposed and located at an angle formed with a longitudinal axis of the housing, the longitudinal axis being disposed through said housing, and measured generally parallel relative to the wearer's face.

4. The headset computing device of claim 3, wherein the angle is in a range of about 45 to about 90.

5. The headset computing device of claim 1, wherein the housing is connected to the display in a manner that is adapted to move the display from between at least two positions;
   wherein at least a first position is the display being supported relative to the wearer's eye and occluding no more than about ten to about twenty percent of the normal field of view; and
   wherein at least a second position is the display is generally positioned closer to the wearer's dominant eye than the first position, the second position being adapted for closely viewing images with the display in front of the wearer's dominant eye.

6. The headset computing device of claim 5, wherein the housing is connected to the display by at least one of an articulating linkage, a telescoping arm, or a slidable arm.

7. The headset computing device of claim 5, wherein the housing further comprises
   a structure adapted to (i) removably connect the support member and the housing to the wearer or to (ii) removably connect the support member and the housing to a second member being supported on the wearer.

8. The headset computing device of claim 7, wherein the structure comprises a clip.

9. The headset computing device of claim 7, wherein the structure removably connects the support member and the housing to:
   (i) an eyeglass frame or removably connects the support member and the housing to (ii) a garment associated with the wearer.

10. The headset computing device of claim 1, further comprising a camera, the camera capturing an image and communicating the image to a circuit that displays the image to the wearer.

11. The headset computing device of claim 10, further comprising a second camera supported on the wearer in a different location than the camera, wherein the second camera captures a second perspective image for display to the wearer.

12. The headset computing device of claim 1, further comprising a power supply operatively connected to the display, wherein the power supply is rechargeable.

13. The headset computing device of claim 12, wherein the power supply is rechargeable by capturing radiofrequency energy.

14. The headset computing device of claim 13, wherein the power supply comprises a coil adapted to capture radiofrequency energy, the radiofrequency energy being created independently relative to the headset computing device.

15. The headset computing device of claim 1, further comprising a noise cancelling microphone, the microphone being operatively connected to a controller.

16. The headset computing device of claim 5, further comprising a sensor that detects a parameter surrounding the wearer, and the sensor outputs a signal to a controller in response to the detected parameter.

17. The headset computing device of claim 1, further comprising an audio transducer outputting audio to the wearer.

18. The headset computing device of claim 1, wherein the image projected onto the eyeglass optical element occludes about five to ten percent of the wearer's vision.

19. The headset computing device of claim 1, said device further comprising the eyeglass optical element.

20. The headset computing device of claim 19 further comprising an intermediate optical element, the intermediate optical element configured to receive the virtual image projected from the display and to present a corresponding image onto the surface of the eyeglass optical element.

21. The headset computing device of claim 1, wherein the eyeglass optical element/display is a screen, a grating, a lens, or a clear optical component.

22. The headset computing device of claim 1 further comprising an intermediate optical element, the intermediate optical element configured to receive the virtual image projected from the display and to present a corresponding image onto the surface of the eyeglass optical element.

23. The headset computing device of claim 22, wherein the corresponding image is optically enhanced.

24. The headset computing device of claim 23, the intermediate optical element further configured to present onto the surface of the eyeglass optical element/display a corresponding image that is in wearer focus and corrected/adjusted for at least one of magnification, optical distortion, astigmatism, and chromatic aberration.

25. A headset computing device comprising:
   a housing;
   a display connected to the housing and configured to project a virtual image and arranged relative to a wearer's eye when the device is mounted on the wearer's head, wherein the same wearer's eye has a total field of view being defined as at most 180 degrees in a horizontal, and at most 120 degrees in a vertical direction; the virtual image projected from the display onto a portion of a surface of an eyeglass optical element external to the housing, the displayed virtual image permitting the wearer to see about ninety to ninety-five percent of the wearer's normal vision through the eyeglass optical element;

a power supply;

a circuit operatively connected to the display, and the power supply;

a support member comprising an eyeglass frame with ear support, the support member being connected to the housing and the display that supports the display relative to the same wearer's eye, the display being located in a position relative to the same wearer's eye so the display is located in a peripheral view of the total field of view of the same wearer's eye while the display is operatively projecting virtual images; and a port being associated with the display, the housing or the support member, the port operatively connected to the circuit for removably connecting at least one additional functional component to the circuit, the port also mechanically supporting the additional functional component.

26. The headset computing device of claim 25, further comprising an additional functional component comprising a removable memory, the component removably engaging with the port, and for operative connection to the circuit.

27. The headset computing device of claim 25, further comprising a removable power supply for removably engaging with the port.

28. The headset computing device of claim 25, wherein the port is located on the display in an accessible location by the wearer.

29. The headset computing device of claim 25, further comprising a wireless transceiver assembly that removably connects to the port.

30. The headset computing device of claim 25, wherein the support structure comprises at least one of an ear loop, or a clip, and wherein the port is located on the support structure.

31. The headset computing device of claim 25, further comprising a lanyard including a housing defining an interior space, the lanyard being supported generally around a rear of the wearer's head, the lanyard housing the port, and the port being operatively connected to the circuit, the port removably connecting at least one additional functional component to the circuit.

32. The headset computing device of claim 31, wherein the lanyard is connected to a pair of glasses supported on the wearer.

33. The headset computing device of claim 31, wherein the lanyard is cushioned for storing a resilient member in the interior space.

34. The headset computing device of claim 31, further comprising a power supply, the power supply being removably connected to the port.

35. The headset computing device of claim 31, further comprising a wireless transceiver being removably connected to the port.

36. The headset computing device of claim 31, further comprising a memory being removably connected to the port.

37. The headset computing device of claim 31, further comprising a controller operatively connected to the circuit for controlling the monocular display, and the functional component.

38. The headset computing device of claim 31, wherein the lanyard is flexible.

39. The headset computing device of claim 31, wherein the port is adapted to removably connect a removable media.

40. The headset computing device of claim 31, further comprising a cushion that is associated with the lanyard and for contacting the wearer.

41. The headset computing device of claim 25, wherein the housing is a first housing, and further comprising:

a second housing supported independently on the wearer relative to the first housing, the second housing including the port, the port being operatively connected to the circuit for removably connecting at least one additional functional component to the circuit.

42. The headset computing device of claim 41, wherein the second housing comprises an ear loop support.

43. The headset computing device of claim 41, wherein the second housing comprises an engagement member for removably connecting to the wearer.

44. The headset computing device of claim 41, wherein the second housing is removably connected to a garment, a hat, eyeglass frame, or sunglass frame of the wearer.

45. The headset computing device of claim 41, further comprising:

a wireless transceiver assembly being supported in or by the second housing, the wireless transceiver assembly being connected to a second power supply and a second circuit, and the wireless transceiver assembly being adapted for wirelessly communication with the circuit.

46. The headset computing device of claim 41, further comprising a functional component being stored in or supported by the second housing.

47. The headset computing device of claim 25, further comprising:

a second component supported around a neck of the wearer, and including an interior space, the second component including the port being operatively connected to the circuit for removably connecting at least one additional functional component to the circuit.

48. The headset computing device of claim 47, wherein the second component includes a monocular display screen on at a surface of a second component housing.

49. The headset computing device of claim 47, wherein the second component is a medallion, and includes at least two different ports removably connecting at least two functional components to the circuit.

50. The headset computing device of claim 47, further comprising a power supply, the power supply being removably connected to the port, and providing power to at least one of the second component and the monocular display.

51. The headset computing device of claim 47, wherein
the second component is supported independently relative to the monocular display or supported around a neck, wrist, ankle, head, arm, or leg of the wearer; and
wherein the second component is supported by a generally flexible elongated member.

52. The headset computing device of claim 25, further comprising a second component being a generally a neck supported electronic medallion, the medallion comprising a user interface on an outer surface of the second component.

53. The headset computing device of claim 47, wherein the second component includes a transceiver that wireless communicates with the circuit.

54. The headset computing device of claim 47, wherein the second component is a medallion that wirelessly communicates with a computing device.

* * * * *